(12) United States Patent
Rong et al.

(10) Patent No.: US 10,139,644 B2
(45) Date of Patent: Nov. 27, 2018

(54) HEAD MOUNTED PROJECTION DISPLAY WITH MULTILAYER BEAM SPLITTER AND COLOR CORRECTION

(71) Applicant: CastAR, Inc., Palo Alto, CA (US)

(72) Inventors: Wei Rong, San Jose, CA (US); Evan Coons, Hayward, CA (US); Jeri J. Ellsworth, San Jose, CA (US); Ken Clements, Los Gatos, CA (US)

(73) Assignee: Tilt Five, Inc

( * ) Notice: Subject to any disclaimer, the term of this patent is extended or adjusted under 35 U.S.C. 154(b) by 0 days.

(21) Appl. No.: 15/638,846

(22) Filed: Jun. 30, 2017

(65) Prior Publication Data

US 2018/0004002 A1   Jan. 4, 2018

Related U.S. Application Data

(60) Provisional application No. 62/357,842, filed on Jul. 1, 2016, provisional application No. 62/453,316, filed on Feb. 1, 2017.

(51) Int. Cl.
*G02B 27/28* (2006.01)
*G02B 27/42* (2006.01)
*G02B 27/01* (2006.01)
*G02B 17/08* (2006.01)

(52) U.S. Cl.
CPC ....... *G02B 27/283* (2013.01); *G02B 27/0101* (2013.01); *G02B 27/4211* (2013.01); *G02B 17/0884* (2013.01); *G02B 2027/011* (2013.01)

(58) Field of Classification Search
CPC ............... G03B 21/006; G03B 21/208; G03B 21/2053; G03B 21/2073; G02B 27/0101; G02B 27/149; G02B 27/283; G02B 27/4211

See application file for complete search history.

(56) References Cited

U.S. PATENT DOCUMENTS

| | | | |
|---|---|---|---|
| 4,312,570 | A | 1/1982 | Southwell |
| 5,383,053 | A | 1/1995 | Hegg |
| 5,572,229 | A | 11/1996 | Fisher |
| 5,606,458 | A | 2/1997 | Fergasson |
| 5,621,572 | A | 4/1997 | Fergasson |
| 6,535,182 | B2 | 3/2003 | Stanton |
| 7,522,344 | B1 | 4/2009 | Curatu |
| 7,525,735 | B2 | 4/2009 | Sottilare |
| 8,259,239 | B2 | 9/2012 | Hua |

(Continued)

OTHER PUBLICATIONS

Southwell, W. H. "Multilayer high reflective coating designs achieving broadband 90 phase change." Los ALamos Conference on Optics' 79. International Society for Optics and Photonics, 1980.

(Continued)

*Primary Examiner* — Sultan Chowdhury

(57) ABSTRACT

A head mounted projection display includes a polarizing beam splitter stack that includes a waveplate. The polarizing beam splitter stack reduces optical losses and has a low forward extension. The polarizing beam splitter may be used at a 45 degree angle or at a non 45 degree angle relative to the line of view. A correction may be also be performed to the intensity of individual pixels to account for chromatic non-uniformity in the optical response of a retroreflector and other optical components.

25 Claims, 24 Drawing Sheets

(56) References Cited

U.S. PATENT DOCUMENTS

| | | | |
|---|---|---|---|
| 8,511,827 B2 | 8/2013 | Hua | |
| 2002/0085281 A1* | 7/2002 | Dubin | G02B 27/283 359/485.01 |
| 2002/0135874 A1* | 9/2002 | Li | G02B 6/4298 359/489.15 |
| 2002/0154273 A1* | 10/2002 | Seo | G03B 21/2073 353/20 |
| 2003/0189676 A1* | 10/2003 | Kato | H04N 9/3105 349/5 |
| 2010/0002154 A1* | 1/2010 | Hua | G02B 13/00 349/11 |
| 2014/0340424 A1 | 11/2014 | Ellsworth | |
| 2014/0376085 A1* | 12/2014 | Papadopoulos | H01S 3/2316 359/349 |
| 2016/0091722 A1* | 3/2016 | Liu | G02B 27/0172 345/8 |

OTHER PUBLICATIONS

West, Edward A., and Matthew H. Smith. "Polarization errors associated with birefringent waveplates." Optical Engineering 34.6 (1995): 1574-1580.

Hua, Hong, et al. "Engineering of head-mounted projective displays." Applied optics 39.22 (2000): 3814-3824.

Arrington, K. F., and G. A. Geri. "Conjugate-optical retroreflector display system: Optical principles and perceptual issues." Journal of the Society for Information Display 8.2 (2000): 123-128.

Hua, Hong, Chunyu Gao, and Jannick P. Rolland. "Study of the imaging properties of retro-reflective materials used in head-mounted projective displays (HMPDs)." SPIE Aerosense 2002 (2002): 1-5.

Martins, Ricardo, and JannickF P. Rolland. "Diffraction of Phase Conjugate Material in a New HMD Architecture." AeroSense 2003. International Society for Optics and Photonics, 2003.

Samoylov, A. V., et al. "Achromatic and super-achromatic zero-order waveplates" Journal of Quantitative Spectroscopy & Radiative Transfer 88 (2004) 319-325.

Hua, Hong, and Chunyu Gao. "A polarized head-mounted projective display." Mixed and Augmented Reality, 2005. Proceedings. Fourth IEEE and ACM International Symposium on. IEEE, 2005.

Rolland, J. Pa, and Hong Hua. "Head-mounted display systems." Encyclopedia of optical engineering (2005): 1-13.

Cakmakci, Ozan, and Jannick Rolland. "Head-worn displays: a review." Display Technology, Journal of 2.3 (2006): 199-216.

Kiyokawa, Kiyoshi. "A wide field-of-view head mounted projective display using hyperbolic half-silvered mirrors." Proceedings of the 2007 6th IEEE and ACM International Symposium on Mixed and Augmented Reality. IEEE Computer Society, 2007.

Krum, David M., Evan A. Suma, and Mark Bolas. "Augmented reality using personal projection and retroreflection." Personal and Ubiquitous Computing 16.1 (2012): 17-26.

Kress, Bernard, and Thad Starner. "A review of head-mounted displays (HMD) technologies and applications for consumer electronics." SPIE Defense, Security, and Sensing. International Society for Optics and Photonics, 2013.

Mukund, R. "Quaternions: Form classical mechanics to computer graphics and beyond." Proceedings of the 7 th Asian Technology conference in Mathematics, 2002.

* cited by examiner

HEAD MOUNTED PROJECTION DISPLAY WITH MULTILAYER BEAM SPLITTER AND COLOR CORRECTION

CROSS REFERENCE TO RELATED APPLICATIONS

This application claims the benefits of U.S. provisional patent application Ser. No. 62/357,842 filed Jul. 1, 2016, and U.S. provisional patent application Ser. No. 62/453,316 filed Feb. 1, 2017, each which are both incorporated in their entirety.

FIELD OF THE INVENTION

Embodiments of the present invention are generally related to the technology of head-mounted projection displays (HMPD) as used in virtual and augmented reality, and other computer graphics applications.

BACKGROUND OF THE INVENTION

There are a variety of different head mounted display technologies used for augmented reality and virtual reality applications. A general problem with head mounted display technologies is obtaining a combination of high image quality, compact size, and a reasonable price point. For example, many head mounted displays extend far out in front of a user's face. For example, some head mounted displays extend out ten centimeters or more from a user's face. Many designs suffer from poor brightness or image quality issues. Additionally, cost is an important consideration in consumer applications.

These considerations are also important in a head-mounted projection display (HMPD) in which image projectors attached to a head-mounted frame project light. Many of these approaches also suffer from one or more problems, including the HMPD extending too far out from the user's face, poor brightness, poor image quality, or high cost. It is also difficult in a HMPD to simultaneously obtained a combination of low extension, high brightness, and high image quality.

One type of HMPD utilizes 45 degree beam splitters to direct projected light out to a retroreflective screen and allow reflected light to be transmitted to a user's eye. FIG. 1A shows a prior art arrangement similar to U.S. Pat. No. 5,606,458. This type of HMPD utilizes a pair of 45 degree beam splitters to direct unpolarized light. In this type of HMPD, the HMPD has one beam splitter placed in front of each of the user's eyes. Each image projector directs projected light through a respective beam splitter and out to a retroreflective screen. The retroreflected light reflects back to the same beam splitter it originated from and the beam splitter directs the reflected light into the user's eyes. FIG. 1B shows in more details aspects of the 45 degree beam splitter. A projector 101, a beam splitter 102 and a retroreflective screen 103 are used to present images to the eye 104 of an observer.

However, the approach of FIG. 1 results in significant loss of brightness, and therefore image contrast, at each pass on/through the beam splitter. The first 3 dB loss path 105 passes through the beam splitter having come from the projector 101. The second 3 dB loss path 106 directs light back into the projector after retroreflection resulting in a combined 6 dB total loss.

In order to reduce these losses, U.S. Pat. No. 5,621,572 and U.S. Pat. No. 8,259,239 developed an improved arrangement similar to that shown in FIG. 2A in which a polarizing beam splitter is used with an additional waveplate. FIG. 2B shows the arrangement of the 45 degree beam splitter and the waveplate in more detail. The projector 201 produces images having plane polarized light (indicated by the "P" designation on the drawing) that reflects at low loss off the front surface of a polarizing beam splitter 202, with a matching polarization orientation, and then passes through a quarter waveplate 203 with fast and slow axes set at 45 degrees from the incident light plane polarization axis, thus converting the polarization from a plane polarization to circular polarization before rebounding from retroreflecting screen 103.

The return path of FIG. 2B takes the light back through 203 where it is converted back to plane polarization, however, having passed twice through the quarter waveplate, the plane of polarization is now rotated ninety degrees, which then passes through the polarizing beam splitter 202 and on to the user's eye 104 with low loss. Those of skill in the art will notice that the reversal of the circularly polarized light with change of handedness results in an added 180 degree rotation of the plane of polarization when the light passes back through the quarter waveplate, but this added flip is no restriction to the continued propagation through 202.

However, a disadvantage of the positioning of the waveplate is that it causes an unwanted extension of the front of the head mounted unit. This can be seen in FIG. 2A and is represented by distance 204 in FIG. 2B. This includes the thickness associated with the waveplate, optical mounts, spacers, vibration dampeners, or other fixtures. In a commercial product the optics have to be comparatively rugged and cheap to manufacture and thus there are practical limitations on how closely optical components can be placed. Additionally the spacing between components has to take into account the need for light from an image projector to diffract, reflect off the beam splitter, and strike the waveplate. The combination of all of the factors leads to a considerable increase in the forward extension. It is believed that this increases the forward extension in the range of 1 cm to 3 cm over a basic design having a 45 degree beam splitter but no waveplate. As a result, the total forward extension is unacceptable for many consumer applications. For example, FIG. 5B of U.S. Pat. No. 8,259,239 shows a thickness of 5 centimeters in a region above a user's brow.

Additionally, the approach of FIG. 2A and FIG. 2B requires a manufacturing step to mount and align the wave plate and associated fixtures. This increases the cost of the HMPD.

Moreover, the approach of FIGS. 2A and 2B introduces the potential for unwanted reflections off the inside surface of wave plate 203. Also, not all rays in the projected Field of View (FoV) will strike the waveplate at an orthogonal angle of incidence which can result in imperfect phase retardation and chromatic distortions. These effects also reduce the image quality of the images that make it to the user's eyes.

SUMMARY

A polarizing beam splitter is disclosed that is a multilayer stack of a polarizing beam splitter and at least one other optical layer to optimize an initial reflection of projected light towards a retroreflector and maximize transmission of returning light. In one embodiment, a polarizing beam splitter stack includes a polarizing beam splitter with a phase retarder layer, or waveplate. The stack may, for example, be formed as a film attached or bonded to the polarizing beam splitter. The phase retarder layer may be a quarter wave film. The multilayer beam splitter stack may be utilized to achieve a maximum reflection of projected light exiting a head mounted display, such as a head mounted projection display (HMPD). The quarter wave film may be used to achieve a high transmission of returning light.

In one embodiment, the polarizing beam splitter stack is designed such that circularly polarized light of a specific handedness (left or right) will be reflected as light of circular polarization, and then after retroreflection, the light will pass back through the multilayer beam splitter to enter a user's eye as plane polarized light. In one embodiment, a circularly polarized projector is used and may be positioned in front of the multilayer structure. Additionally, in one embodiment, orthogonal polarization may be used for each of the user's eyes to provide for stereoscopic isolation of stereoscopic images without added filtering.

Furthermore, in one embodiment, a HMPD system used in augmented reality applications has real-time information relating the position and orientation (pose) of the projector with regard to a retroreflective surface that is returning the projected image back to the eyes of the user. Based on that real-time information and calibration information regarding the optical characterization of the retroreflective surface, an adjustment is made to the intensities of the primary colors of the projected pixels based on calculating the incidence angle of each pixel, so as to compensate for image distortion due to imperfect headset optics and imperfect retroreflection.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

Embodiments of the present invention are generally related to improvements in head mounted projection displays (HMPDs), although one of ordinary skill in the art would understand that there are other applications as well. This includes HMPDs in which a beam splitter is used to direct projected light out of the HMPD and receive returning light.

Figure 1A:
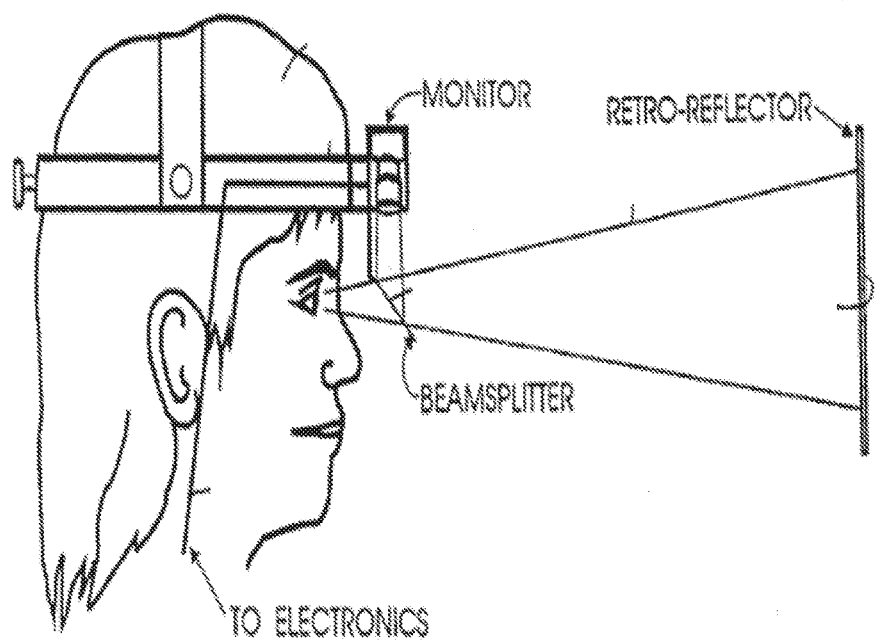
FIG. 1A illustrates a coaxial viewing arrangement for images returned by retroreflective screen and FIG. 1B illustrates in more detail aspects of the 45 degree beam splitter.
Figure 1B:
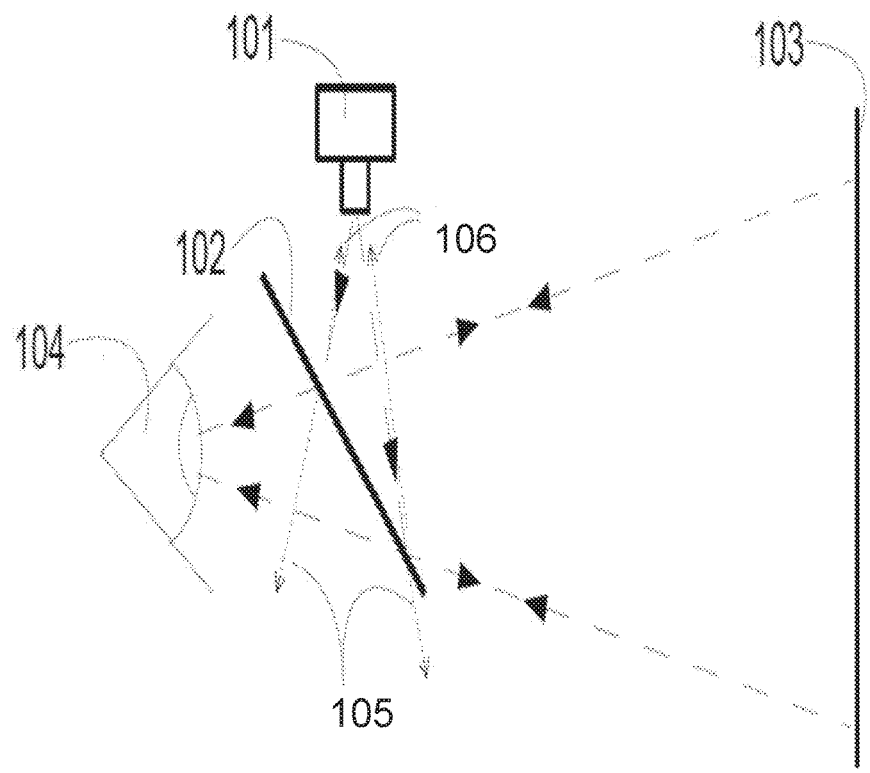
Figure 2A:
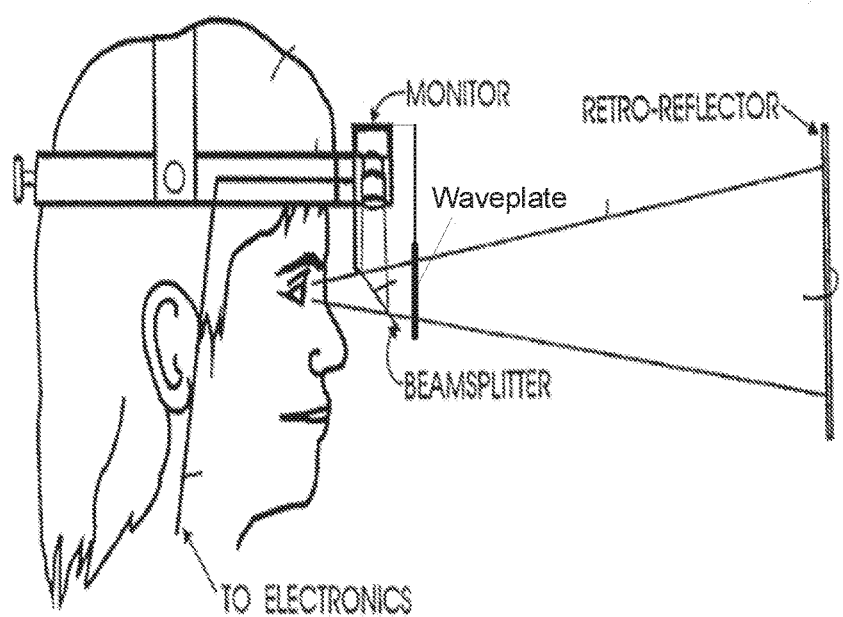
FIG. 2A illustrates head mount projection display arrangement using polarized light and polarized beam splitters.
Figure 2B:
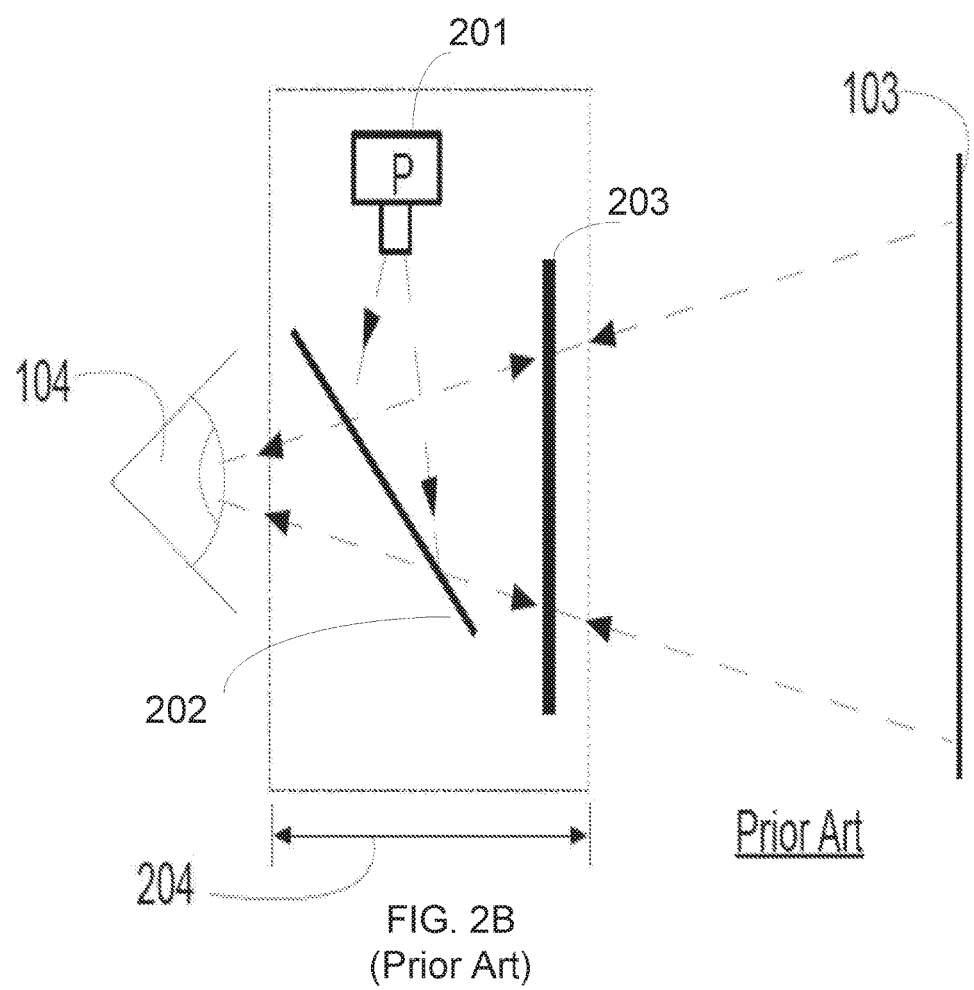
FIG. 2B illustrates the arrangement of FIG. 2A showing the polarizing beam splitter geometry in more detail and a forward extension distance.
Figure 3A:
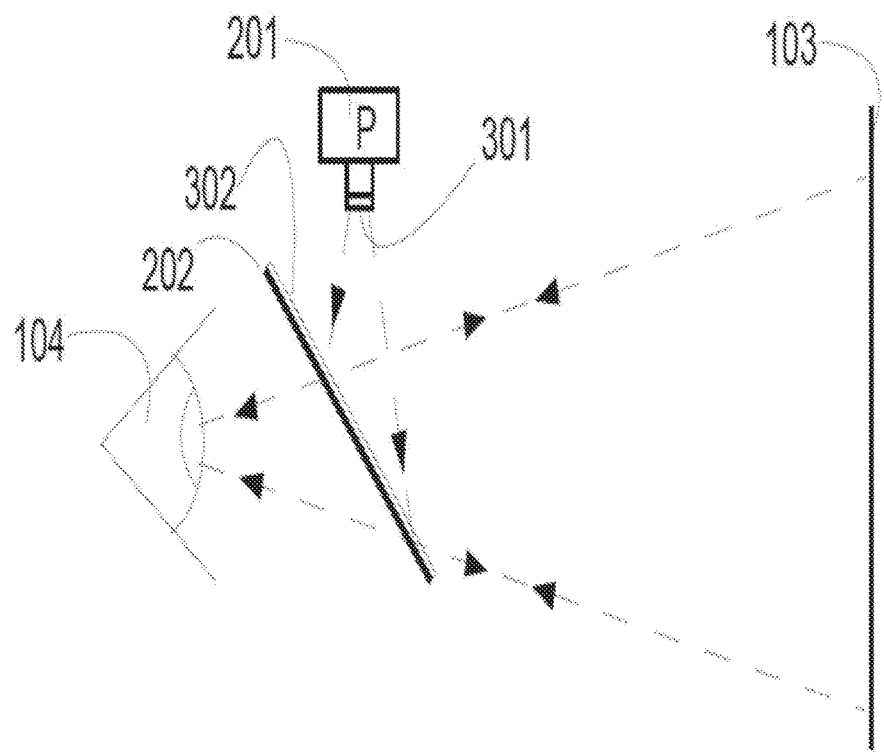
FIG. 3A illustrates stacking of a polarizing beam splitter and a waveplate in accordance with an embodiment.

FIG. 3A shows an embodiment in which the projector 201 of a HMPD has its plane polarized (P in projector 201) output changed to circular polarization by a quarter waveplate optical retarder 301. The circularly polarized light passing through quarter waveplate optical retarder 301 then encounters another quarter wave retarding film 302 that has been placed (stacked-up) on the face of the polarizing beam splitter 202 with fast and slow axes orientated 45° with respect to the plane polarization axis of polarizing beam splitter 202. The quarter wave retarding film 302 may be stacked on the face of the polarizing beam splitter by, for example, manufacturing techniques such as film deposition or film coating, film bonding, film transfer and adhesion, or other manufacturing techniques to stack a film on top of another optical component.

Having passed once through quarter wave retarding film 302 to reach the surface of polarizing beam splitter 202, light is converted to a plane polarization of the correct orientation to achieve a maximum reflection (e.g., 90° from the pass through orientation or a close approximation thereof). However, after the projected light reflects back from the retroreflector 103, it is reflected back through quarter wave retarding film 302. In particular, on the path back from the retroreflecting screen 103, the circularly polarized light passes again through the quarter wave retarding film 302 to become plane polarized at 90° from the light that had been reflected from the polarizing beam splitter. This plane polarization, in turn, results in it being passed through polarizing beam splitter 202 on the way to the user's eye 104 with low loss. This reduction in loss yields benefits in brightness and with that, improvements in contrast.

In some embodiments further layers may be added to the eye side of the beam splitter 202 such as an anti reflective coating to reduce reflections off that side, and/or non-birefringent optical clear layers may be added at chosen places in the stack to increase rigidity, strength or to provide surface protection.

In some embodiments the polarizing beam splitter 202 is mounted at a 45 degree angle with respect to a line of view and the angle of incidence of the projected light. However, in one embodiment, the beam splitter is not mounted at a 45 degree angle. In particularly, a substantially non-45 degree angle could be used, such as angle at least 5 degrees off of a traditional 45 degree beam splitting geometry.

Additionally, in some embodiments the projector is also tilted at a substantial angle with respect to a normal to the line of view. This can be used for a variety of purposes, including reducing the forward extension of a HMPD and/or for customizing the HMPD for an optical geometry in which the user's gaze is looking downward.

In a glasses design, there is a forward extension, particularly in a brow region above a user's eyes. The forward extension in the brow region of the glasses is associated with the projector, components to mount the polarizing beam splitter, etc. The polarizing beam splitter is preferably approximately coaxial with the user's eyes for maximum brightness, but in practice the polarizing beam splitter can be mounted slightly above the center of the user's eyes. Generally, reducing a thickness of the polarizing beam splitter and associated optics will reduce the required forward extension in the brow region correspondingly (and may in some cases also permit a reduction in a thickness of a viewing lens portion of a glasses design).

Figure 3B:
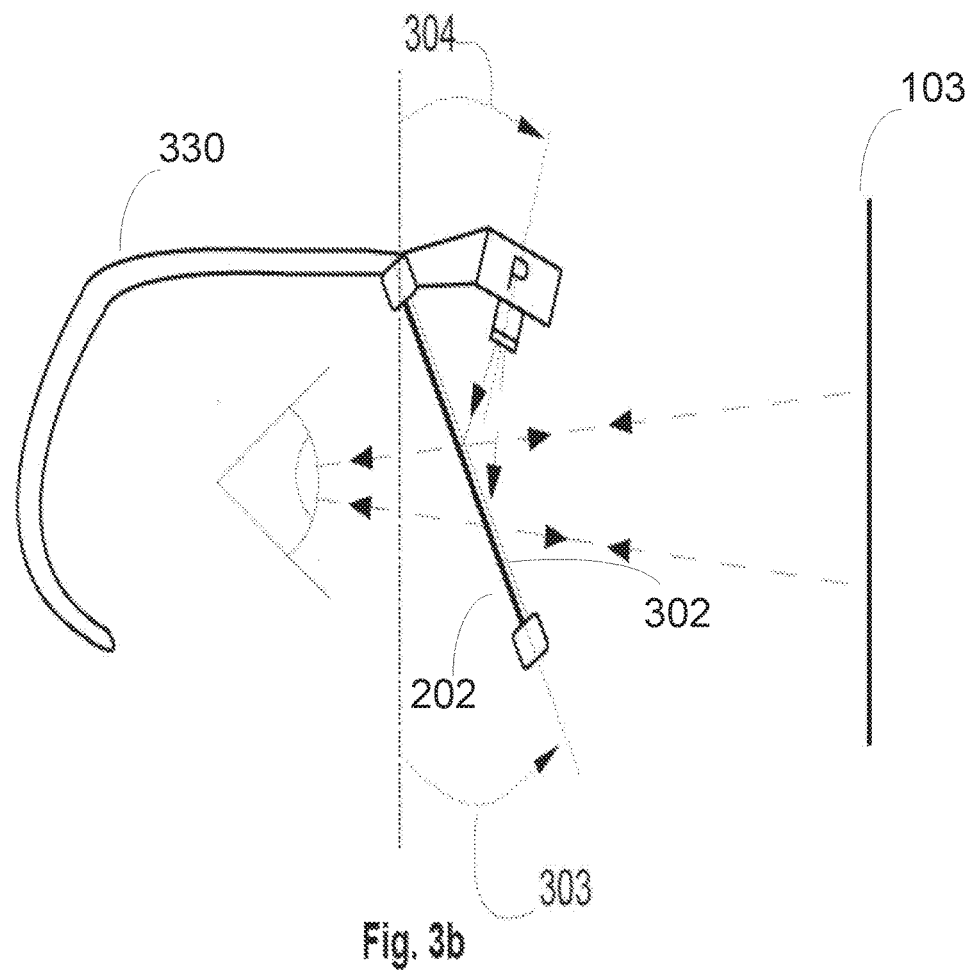
FIG. 3B illustrates examples angles projector rotation and a non 45 degree angle of incidence to the beam splitter.

FIG. 3B illustrates an example in which the polarizing beam splitter stack is mounted at a lens stack rotation angle (LSRA) 303 with respect to the vertical, and the projector is mounted at the projector rotation angle (PRA) 304 with respect to the vertical. A side view of the glasses frame 330 is also illustrated such that one of ordinary skill in the art would understand the optical components are mounted to the glasses frame 330 with some conventional optical components, such as viewing lenses, not illustrated. Those skilled in the art will understand that adjustment of LSRA and PRA together with the Field of View (FoV) of the projector optics allows design options for setting the line of view to the retroreflective screen. A reduced LSRA also allows for a headset that has less forward extension, which is generally desirable. This lessening of forward extension is shown as distance 310 in FIG. 3G. this distance 310 might be compared with a distance if a 45 degree geometry was used, as illustrated by the 45 degree comparison line. Depending on the LSRA and PRA selected, anywhere from about a 10% to a 50% or more reduction in the forward extension in a brow region associated with the beam splitter is possible.

Figure 3C:
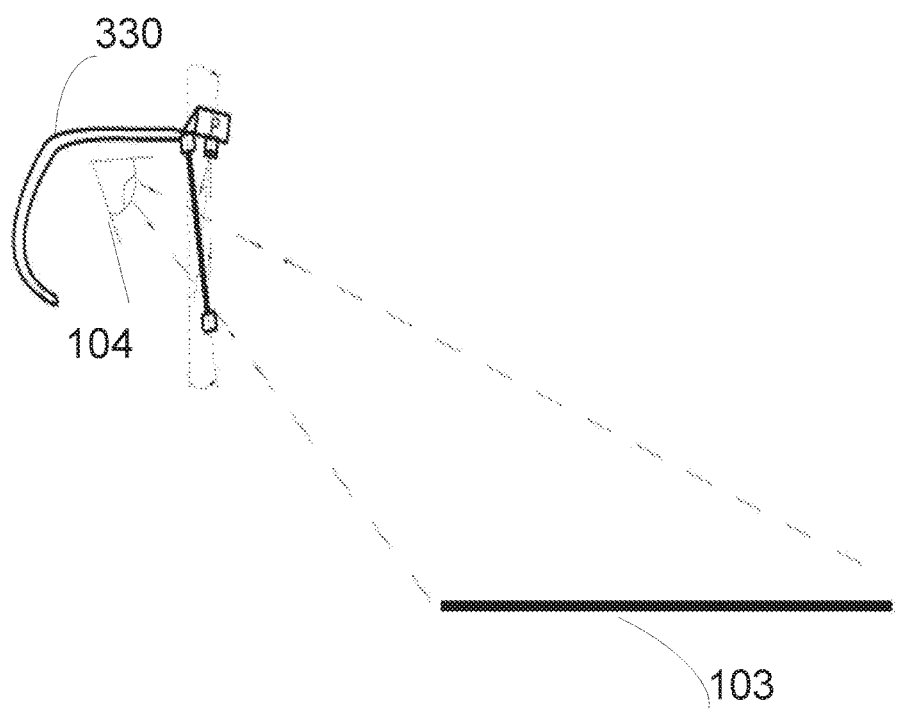
FIG. 3C illustrates an embodiment in which there is a horizontal retroreflective screen.
Figure 3D:
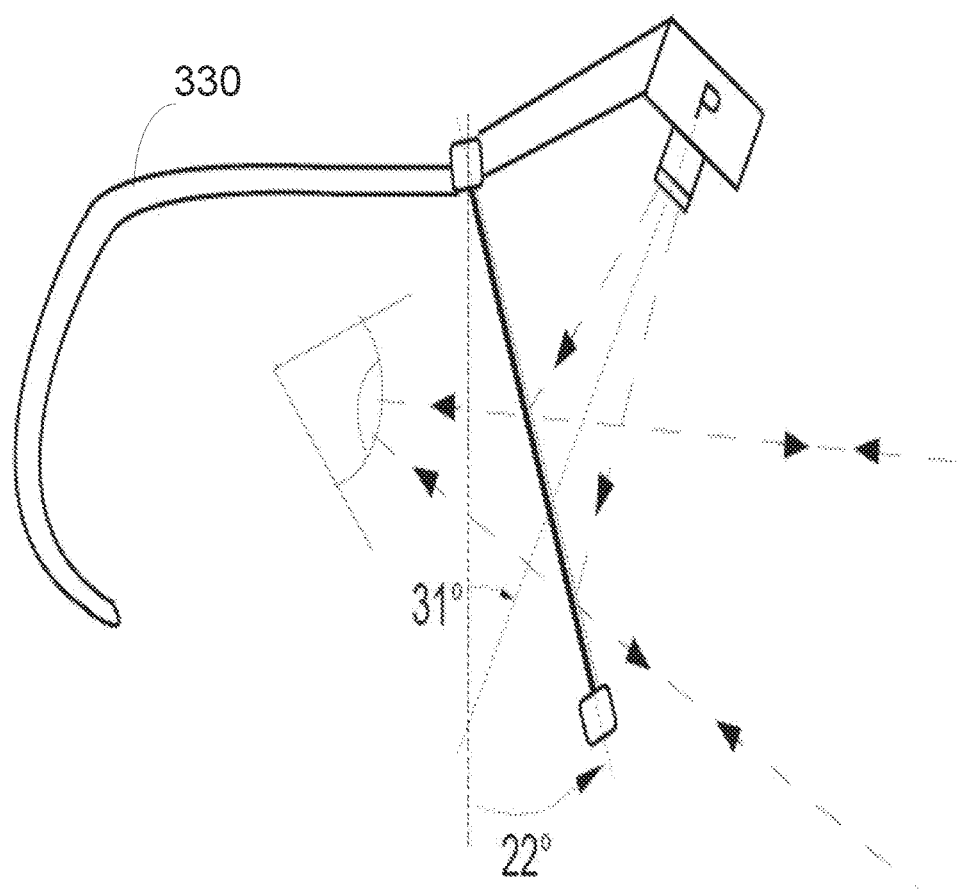
FIG. 3D illustrates an embodiment with declined angle of view.

FIG. 3C illustrates an example in which the retroreflective screen 103 is placed on a flat table in front of a user, such as an augmented reality board game. In this example, it is desirable to adjust the LSRA and PRA to give a downward angle of view. An example embodiment of such is shown in FIG. 3D in which the LSRA is set at 22 degrees and the PRA is set at −31 degrees so as to result in a lowering of line of sight by approximately 15 degrees from the horizontal.

Those skilled in the art will understand that other results may be achieved with other ranges of values for the LSRA and PRA. For example, the shift in the downward angle of view will depend on many factors, such as a distance from a horizontal retroreflective screen and a height of the HMPD above the retroreflective screen. However, in many various applications this would be a lowering of line of sight would be in the range of 5 degrees to 30 degrees from the horizontal. However, in many game applications the lowering of the line of sight is in the range of 10 degrees to 20 degrees. In a particular application, the LSRA and PRA may be further set based on other considerations. For example, the selection of the LSRA and PRA will affect the forward protrusion in a lens section. However, the selection of the PRA and the LSRA also influences the optical characteristics of the polarizing beam splitter stack. In particular, as described below in more detail, a non-normal angle of incidence of light may increase some wavelength-dependent (chromatic) non-uniformities of the polarizing beam splitter stack.

Some embodiments may have a mechanical adjustment means in the frame of the headset to allow the user to change the LSRA and/or PRA arrangement for different applications or position of the retroreflective screen. For example, a pivot and a mechanical latching system could have several different settings for the user to change a rotation angle and set the LSRA and/or PRA angles. For example, a first setting could set the LSRA/or PRA for viewing straight ahead, such as looking at a wall or other vertical surface. At least one other setting could be selected by a mechanical adjustment for a downward angle of view. In principle, other mechanical adjustments could be selected for an upward angle of view, e.g., gazing up high on a wall or on a ceiling. In addition to mechanical adjustments, it will be understood that a micromotor or actuators could be used to support automatic adjustments of the LSRA and/or PRA using a microcontroller.

Figure 3E:
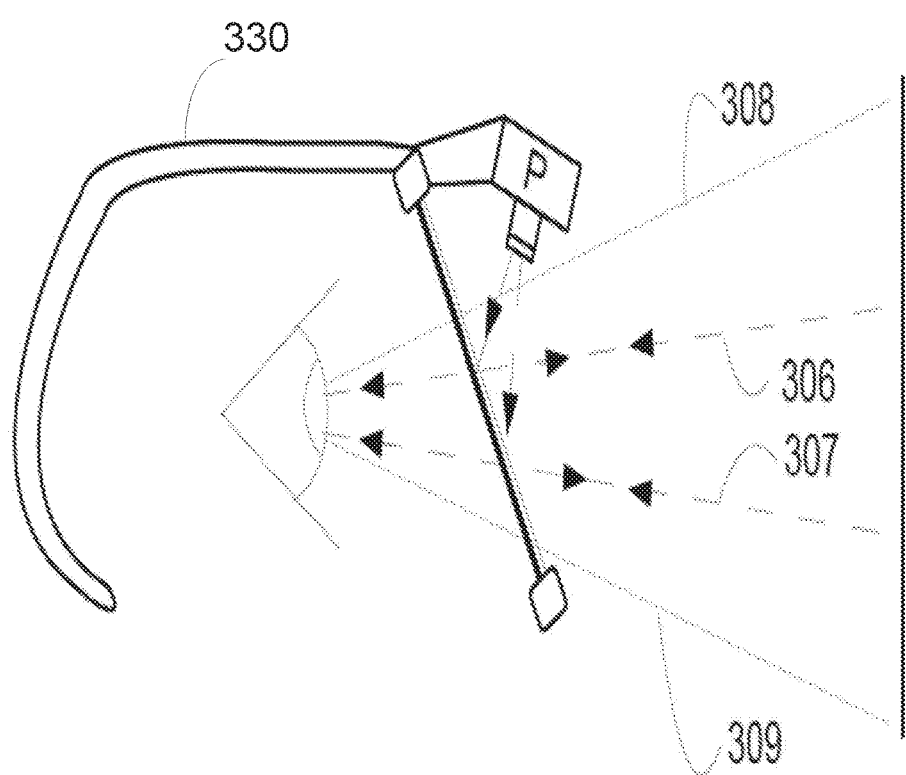
FIG. 3E illustrates FoV bounding angles in accordance with an embodiment.

In one embodiment, a primary optical axis of the eye is aligned closely (within plus or minus 10°) with the reflected central ray of the projector. This can be achieved when the projector is located such that its reflection, in the lens stack, is at the eye position. The size of the frame and stacked lens are chosen to be large enough, and with reduced LSRA, such that those angles do not limit the returning rays from the projector FoV from reaching the pupil of the eye. This can be seen in FIG. 3E where the FoV of the projector is represented by the angle between boundary rays 306 and 307, which are positioned somewhere (not necessarily shown to scale) within the limits 308 and 309 that are set by size of the frame, the widths of lens stacks and LSRA position. When central rays are closely aligned, the bisector of the angle from 306 to 307 will match the bisector of the angle from 308 to 309.

That central projection ray will originate at the angle, PRA 304, with respect to the vertical, and then reflect off the lens stack positioned at angle LSRA 303. While the lens stack acts as a mirror, its rotation angle LSRA has a double effect on the resulting ray so the angle of that result with respect to the vertical will equal 2*LSRA−PRA. (Where "*" is a multiplication operation and the negative sign on PRA comes because it is a clockwise rotation.) However, it is more helpful to have the projector central ray angle (PCRA)

calculated with regard to the horizontal, so a 90° correction may be applied giving:

PRCA=2*LSRA−PRA−90°.

As an example, a beam splitter at 45° from the vertical and a projector pointing directly down from the vertical, produces a projector central ray angle of: 2*45°−0°−90°=0°, while the example of FIG. 3D gives: PRCA=2*22°−(−31°)−90°=−15°.

Figure 3F:
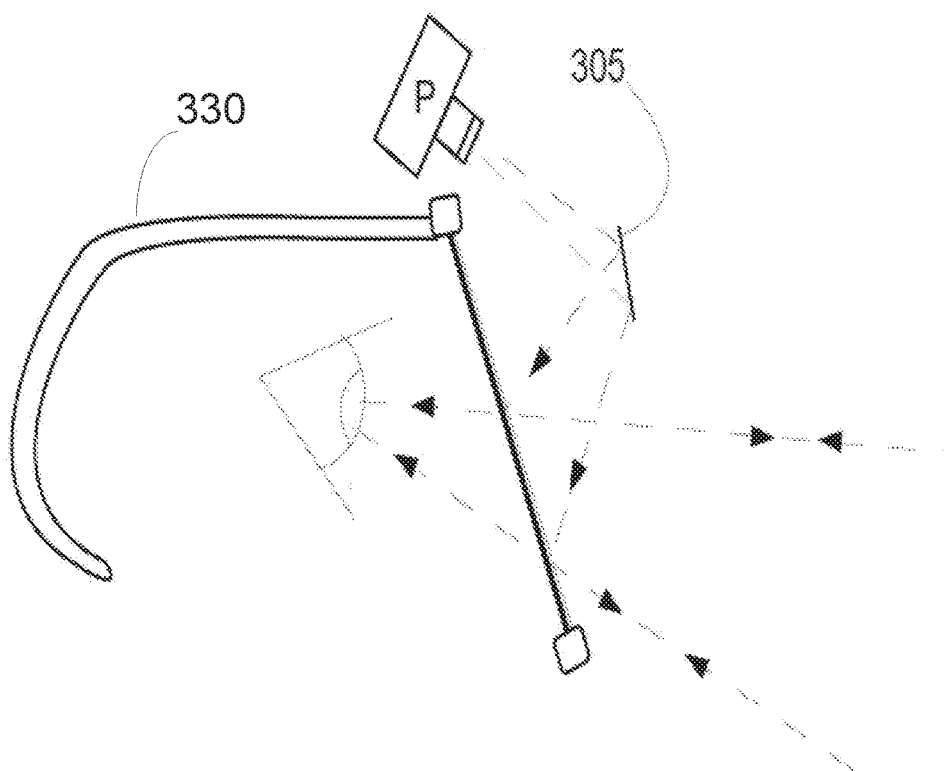
FIG. 3F illustrates an embodiment with a mirror to change projector angle.
Figure 3G:
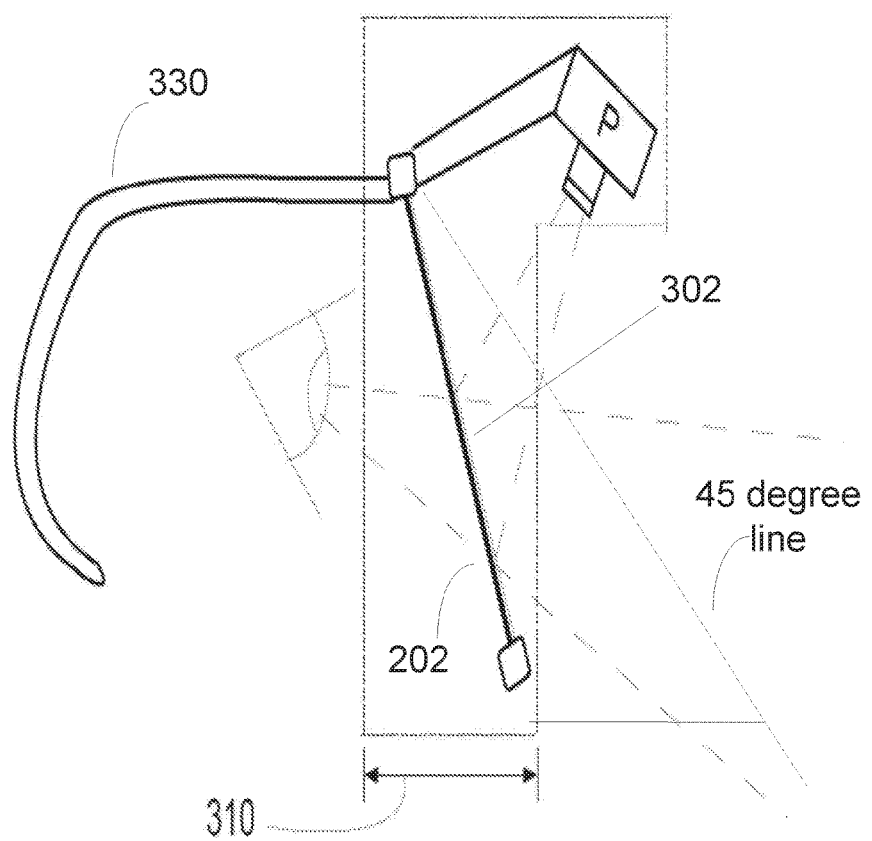
FIG. 3G illustrates an embodiment showing reduced forward extension.

In some embodiments, the physical size of the projectors may make their placement in front of the stacked lenses bulky or otherwise less desirable. Those skilled in the art will understand that, as shown in FIG. 3F, mirrors 305 or prisms may be mounted in front of the stacked lenses allowing the projectors to be relocated back on the upper frame. Image flips may be implemented in software to compensate for the reversal introduced by the reflection. Some embodiments may make use of curved reflective optics for 305 so as to better control the projector FoV spread and/or alignment.

When images are projected through flat waveplates, the rays incident at wide angles will not pass through at orthogonal angles as do the central rays. This is well known in the prior art as a limit on wide FoV. At a narrow FoV most rays will be near normal incident and the polarization along the slow axis will be retarded in phase relative to the fast axis based on the birefringence (difference in index of refraction between the paths) and the thickness of the layer. At a wide FoV the rays far from the center are incident at an angle, θ, from the normal such that travel through the layer is extended beyond the thickness of the layer to become approximately that thickness divided by cos(θ). This problem is least shown by so called "true zero order" wave plates in which the layer is so thin that the total travel is only enough for the specified phase delay, such as ¼ wave. Those of skill in the art will understand that embodiments of the invention may use polymer zero order films that have the least variation of phase delay with both wavelength and angle of incidence. To the extent that phase delay errors in the waveplate are present across the field of view, these will result in losses of brightness which may be corrected in software by application of correction maps for each primary color pixel sent to the projector.

Figure 4:
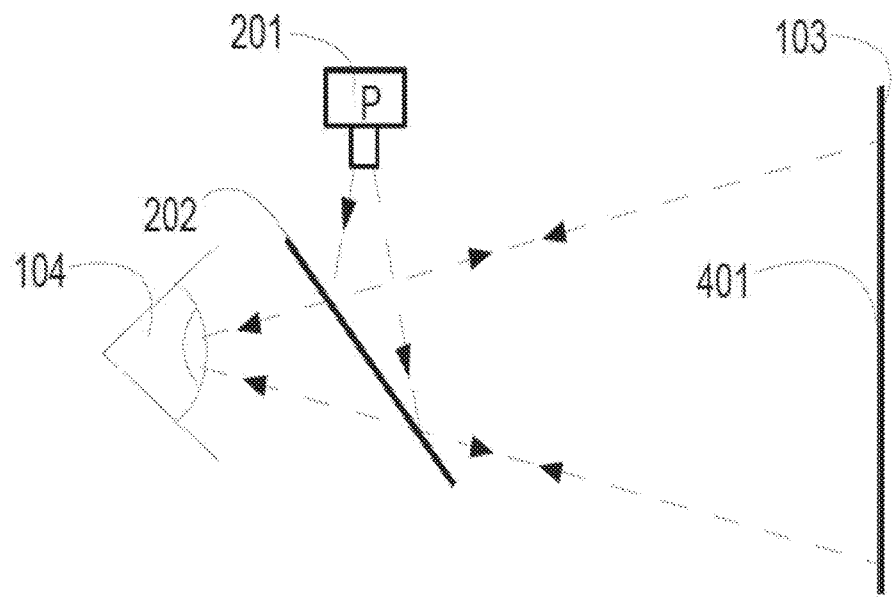
FIG. 4 illustrates an embodiment having a phase retarding film on retroreflector.

In another embodiment, the quarter waveplate may take the form of a film 401 placed on or bonded to the surface of the retroreflecting sheet 103, as shown in FIG. 4. In this embodiment, the polarized light travels from the head mounted projection display in plane polarized form, but is converted by the film 401 (with 45 degree fast and slow axes orientation) so as to be circularly polarized just at contact to the surface of retroreflector 103. As in the prior case, the light passes again through 401 on the way back so as to achieve the 90° plane rotation needed to pass through 202 with low loss. The phase retarding layer may be combined with an anti-reflection coating to also reduce non-retroreflective specular reflections, which are undesired.

Figure 5:
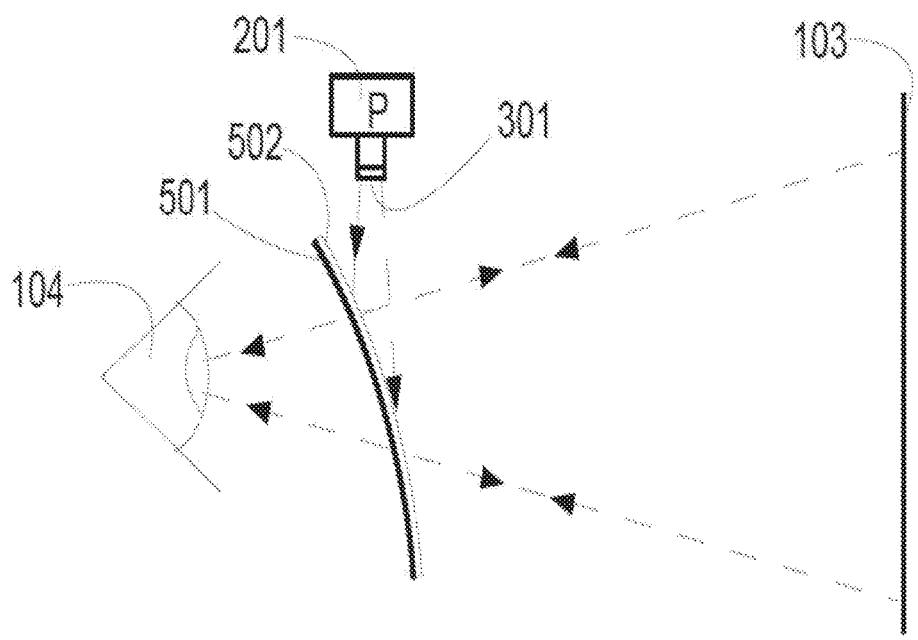
FIG. 5 illustrates embodiment of stacking a polarizing beam splitter and a waveplate using curved surfaces.
Figure 5B:
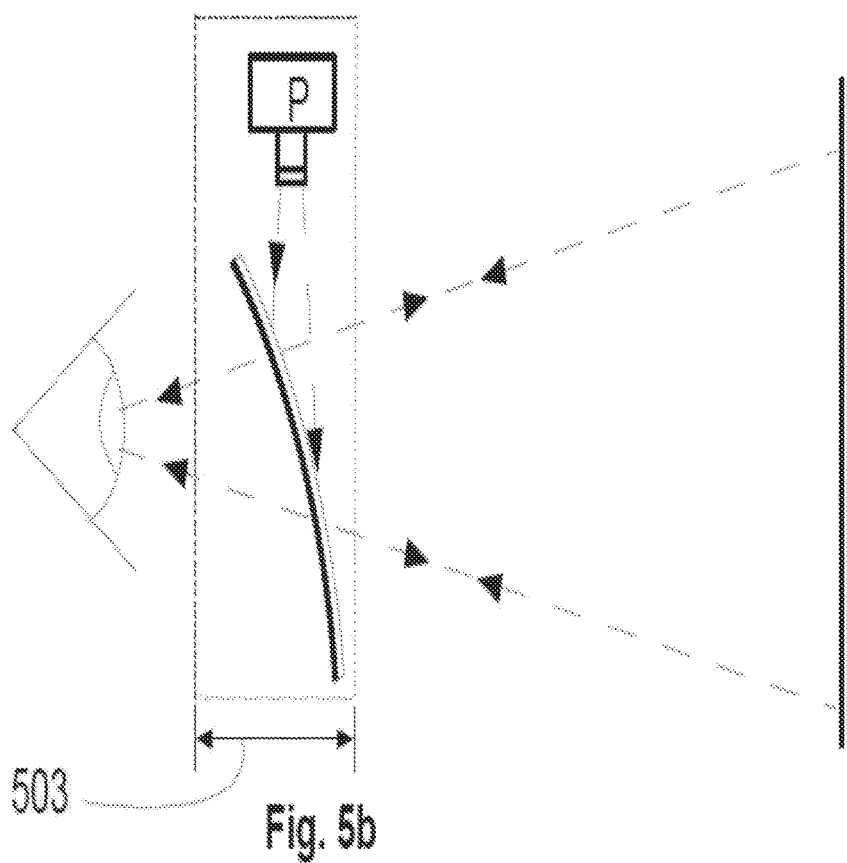
FIG. 5B illustrates an embodiment with curved beam splitter showing reduced forward extension.

The embodiment shown in FIG. 5 uses a curved stack of quarter wave retarding film 502 on polarizing beam splitter 501 so as to allow higher field of view due to the spreading of the light by the convex curvature. This use of the curved reflector adds flexibility to the design of the projection optics in projector 201, in combination with compensating pre-distortion of images in software. Those of ordinary skill in the art will understand that the custom retroreflector with quarter wave film show in FIG. 4 may also be used with a curved polarizing beam splitter as in FIG. 5. As shown in FIG. 5B, the use of a curved beam splitter may also advantageously reduce the forward extension distance 503.

Figure 6:
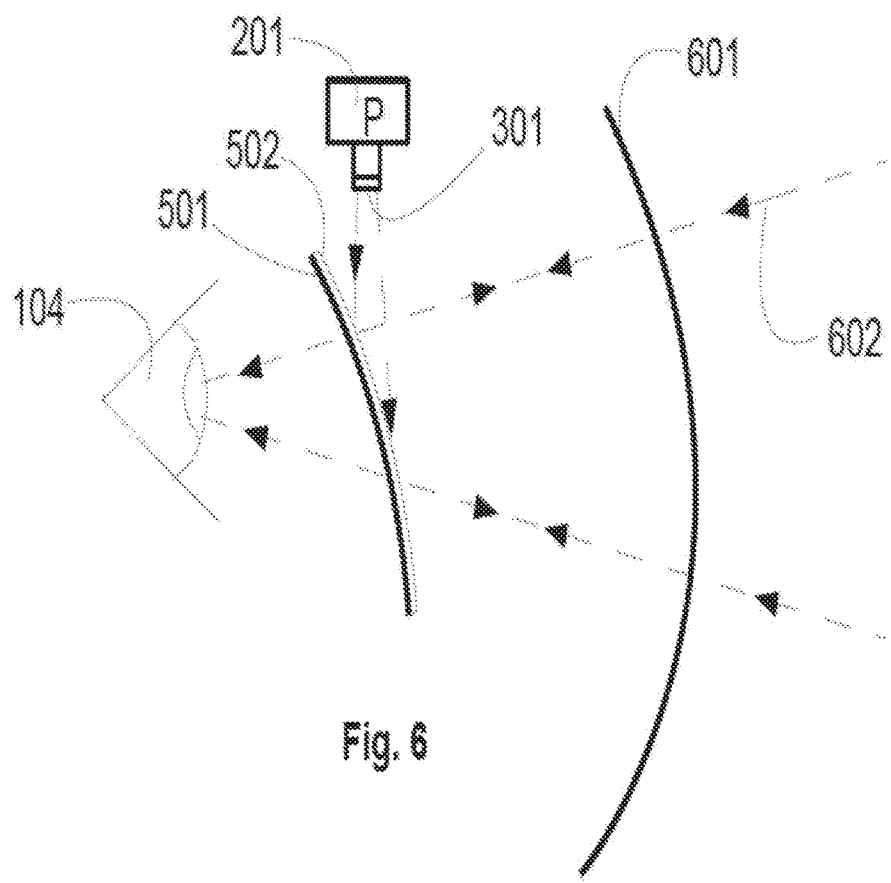
FIG. 6 illustrates an embodiment using a semitransparent reflector to change an augmented reality mode.
Figure 7:
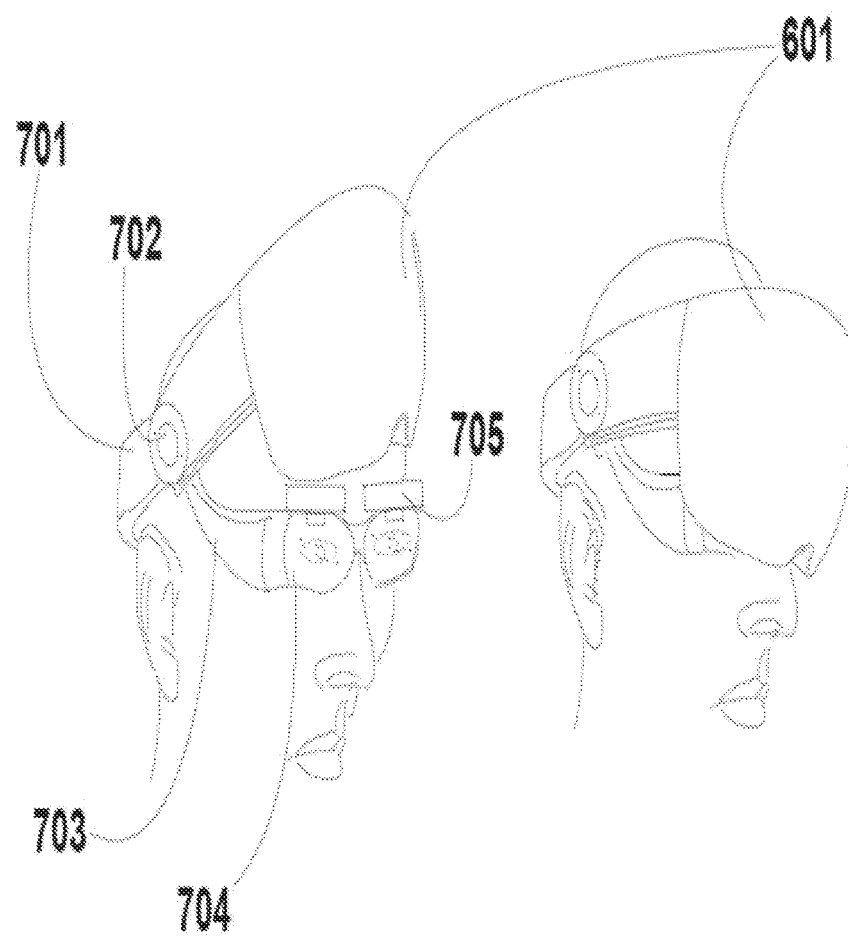
FIG. 7 illustrates a head mounted frame allow changing a mode of operation by visor tilt-up in accordance with an embodiment.

In one embodiment, a mechanism is provided to optionally redirect the output of projectors directly back into the user's eyes in a near eye mode. This may include a clip on unit, visor, or other attachment that can be used to redirect the output to a near eye mode. Example embodiments are shown in FIG. 6 and FIG. 7 where a semitransparent reflecting visor 601 is introduced in the optical path to reflect the output of the projectors 201 through the optical layers 301 and 502, then back to the user's eyes 104. Visor 601 is anchored to the headset but may be arranged to be movable (as shown in FIG. 7) out of the optical path as desired to change augmented reality modes. The curvature of the concave inner surface of 601 may be shaped to essentially reverse the path of the projector output as known in the art.

Although shown as semitransparent so that the ambient light 602 can be combined with the projector output (typical augmented reality application), those of skill in the art will understand that 601 may be completely reflective thus changing the optical mode from augmented reality to full virtual reality, or may be made of a material that can be switched among optical states: transparent, semireflective or completely reflective. Those skilled in the art will also understand that the optical state of visor 601 may be controlled by means receiving information from head pose determining circuits or means of detecting that a retroreflective screen such as 103 is not present in the current viewing direction, and thus cause the optical state of visor 601 to switch so as to make the computer generated images visible to the user.

The embodiment illustrated in FIG. 7 shows a head mounted frame 701 with hinge 702 allowing the reflective or semireflective visor 601 to be "tilted-up" out of the optical path. In the up position, the projectors 705 (combined 201 and 301) reflect image light off the beam splitters 704 (combined 501 and 502) supported on stationary frame segment 703 to travel first to an external retroreflector (not shown) and then back through 704. In the down position, 601 reflects the images from projectors directly back through beam splitters 704 providing the conventional virtual reality configuration when 601 is fully reflective, and conventional augmented reality configuration when 601 is a semitransparent reflector. Those skilled in the art will understand that visor 601 could also be held in a means that clips on to frame 701 without a hinge arrangement, or may permanently attached to the frame 701 with electronic means to change reflective state.

Retroreflective surfaces in common use for augmented reality displays typically take the form of either cube corner design or glass bead. A cube corner retroreflective surface has a high return percentage of projected light (return ratio), but is more expensive and has a narrow range of usable incidence angle whereas glass bead covered fabric is low cost and has wider angle response, but at a lower return ratio.

Furthermore, the return ratio of many retroreflective surfaces varies not only with incidence angle, but also with wavelength. Common projection systems are based on projecting each of primary wavelengths for red, green and blue, but the resulting perceived colors may change based on the return ratios of each primary at indent angles of the rays from each pixel that strikes the retroreflective surface. Thus, objects problematically change shades of color with different viewing angles.

In one embodiment, the intensity of the primary color pixels is adjusted to at least partially compensate for: 1) the manner in which the return ratios of each primary color varies with incidence angles of rays from each pixel that strike a retroreflective surface; and/or 2) other optical characteristics that may be affected by the angle of incidence, such as optical characteristics of the polarizing beam splitter stack at non-normal angles of incidence. Added expense is required to design wave plates and retroreflectors to compensate for incidence angles far away from perpendicular, but when seen in the system arrangement of the HMPD, this problem can be compensated, in accordance with an embodiment, by adjusting the primary color intensities of the pixels, not only by fixed incidence angle within the projection FoV (as mentioned above), but also given the real-time information obtained from the pose tracking system regarding the angle from the HMPD to the retroreflective surface.

In a HMPD the head pose tracking information includes information relating the position and orientation (pose) of the projector with regards to the retroreflective surface that is returning the projected image back to the eyes of the user. This information may be used to perform an adjustment of the brightness of individual pixel colors. The adjustment may be performed based on the incidence angle with respect to the surface and may take into account aspects of the retroreflector and also the optical characteristics of the stacked polarizing beam splitter. The adjustment may be performed in a rendering pipeline. Alternately, it may be performed in a post-processing step to adjust the brightness of individual pixel colors to be projected.

The brightness adjustment may take into account different factors, depending on the degree of correction that is desired. First, some light sources, such as LEDs, are not purely monochromatic but emit over a range of wavelengths. Thus, each primary color will have a range of wavelengths. The retroreflector will, generally speaking, have both a chromatic response and an angular response. Additionally, the polarizing beam splitter stack will have a chromatic response and an angular response. In a first order correction some of these factors may be omitted. If greater correction is desired, then the different potential corrections may all be taken into account. All of these different effects may be used to calculate a brightness correction for each pixel of an image to be projected.

Specifically, in one embodiment, in shading the pixels the system may use the head pose angle with regard to the retroreflective surface (having pre-calibrated the return characteristic of the given surface as a function of wavelength and incidence angle) to calculate the return ratio for each primary color wavelength, and then boost the brightness of that primary to compensate for the expected return loss so as to keep a balanced perceived shading as the user changes viewing position.

Figure 8:
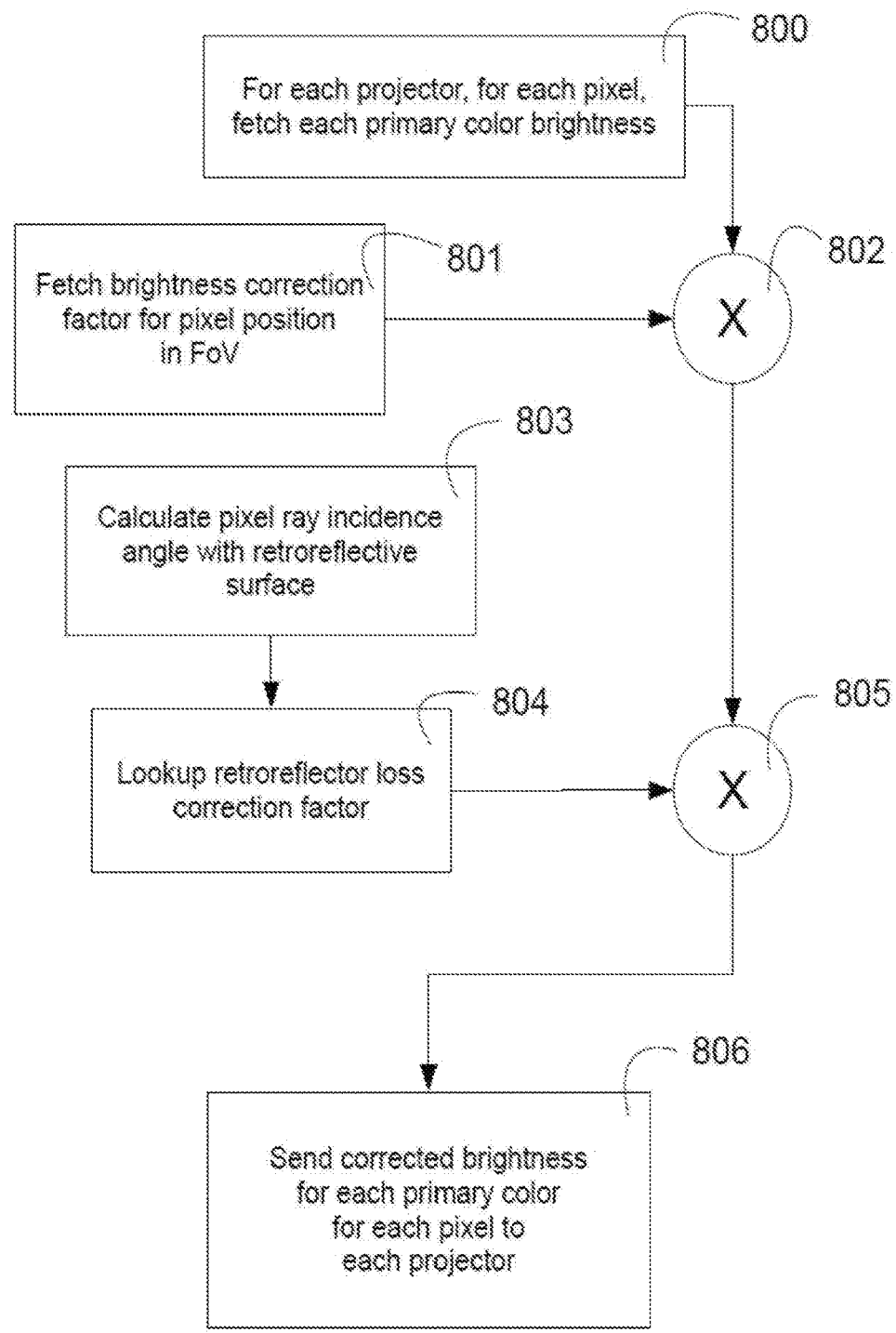
FIG. 8 is a flow chart illustrating a method of pixel brightness correction in accordance with an embodiment.

FIG. 8 shows an example flow chart of such an adjustment of images to be projected. The operation is shown as applied on a per color per pixel per projector basis, but those skilled in the art will understand that the equivalent operation may be applied on an entire buffered image or in any partial buffering design such as line by line. The method of FIG. 8 relies on a map (per primary color) of the FoV for each projector and its subsequent optics path (generated during device calibration) such that each projector pixel position (for each projector) corresponds to a correction factor which may be multiplied by the buffered image pixel brightness value to compensate for relative brightness loss across the FoV.

The map may be in the form of a lookup table or may be represented by a parametric mathematical function of pixel position yielding the equivalent factor. For each fetched pixel in the image to be projected (step 800), given a calibrated projector, step 801 shows looking up the optics loss correction factor for the projector at the said pixel location. Step 802 shows multiplying the pixel brightness by the correction factor to compensate for the loss at that pixel (done for each primary color at said pixel). Step 803 shows using the head pose (from the tracking system) with regard to the retroreflective surface to calculate the angle of incidence of the light rays of the given pixel with said surface. Step 804 shows a lookup of the retroreflection loss factor from the calibration data for the given retroreflective surface at the incidence angle calculated in step 803. Step 805 shows the corrected brightness values for each primary color from step 802 multiplied by the surface loss correction factor from step 804 yielding the final brightness value to be transmitted to the corresponding projector in step 806.

Those skilled in the art will understand that the method of FIG. 8 may be carried out by programmed processor, central processing unit (CPU) graphics processing unit (GPU), or may be implemented in special logic gate array(s), ASIC(s) or other circuit means.

Figure 9:
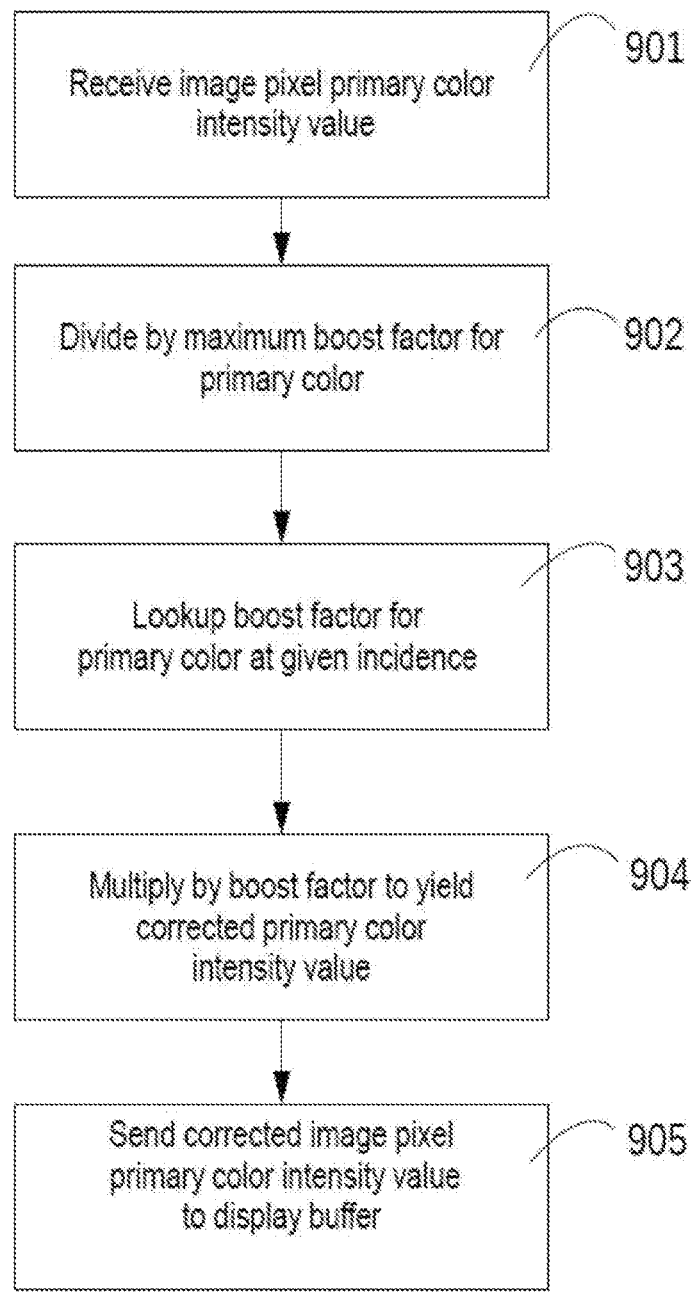
FIG. 9 is a flow chart illustrating a method of pixel brightness including normalization and a boost factor in accordance with an embodiment.

FIG. 9 shows another example flow chart of an adjustment to images to be projected based on normalization and boosting. For the purposes of illustration, a correction to a single primary color is illustrated, although it will be understood that the correction may be performed for all primary colors. In step 901, a pixel primary color value is received for a pixel. In step 902 a pre-scaling is performed. The pre-scaling may include dividing the received intensity value by a maximum boost factor for the primary color. In step 903 a boost factor is looked up for the primary color at the angle of incidence for that pixel. That is the pixel has image coordinates (u, v) and there is a corresponding incidence angle of the ray path from the pixel location, which is described below in more detail. In step 904, the scaled pixel primary color intensity value is then boosted by the looked-up boost factor to generate a corrected primary color intensity values. In step 905, this corrected image pixel color intensity value is sent to a display buffer.

Those skilled in the art will understand that the method of FIG. 9 may be carried out by programmed processor, GPU, or may be implemented in special logic gate array(s), ASIC(s) or other circuit means.

It will be understood that the corrections of FIGS. 8 and 9 may be performed independently. However, variations are possible in which common factors are used for one or more of the initial steps.

Figure 10:
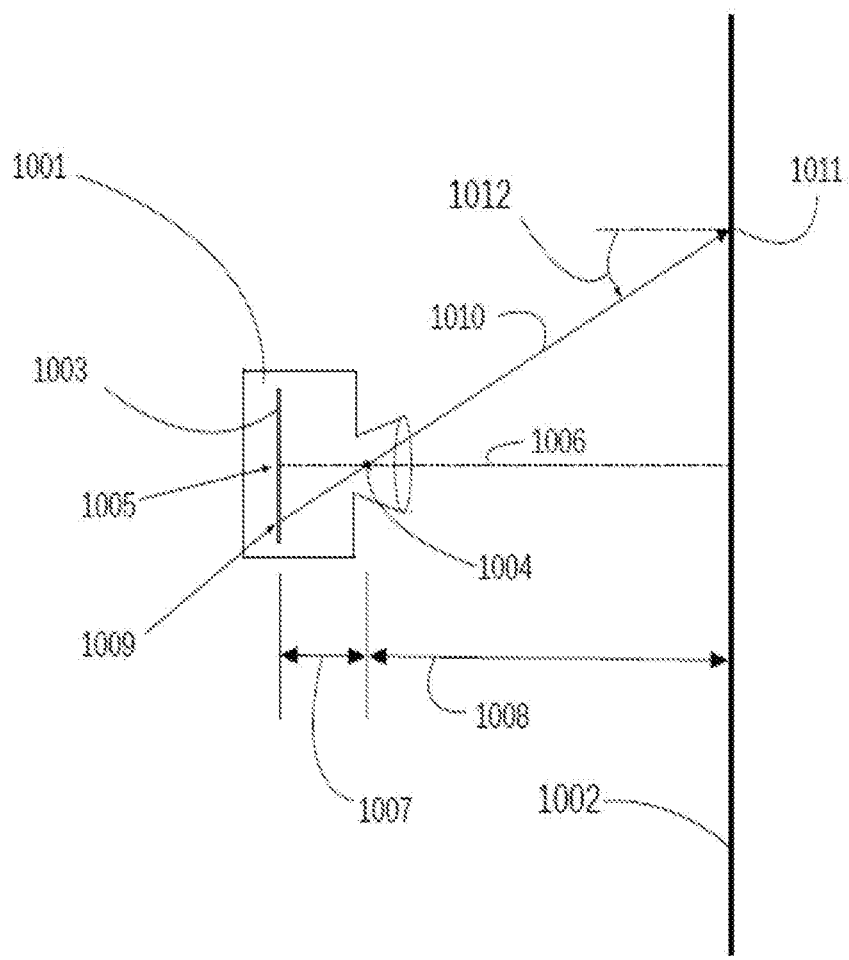
FIG. 10 illustrates an optical geometry for calculating angles for determining a brightness correction factor with the projector normal to the retroreflective screen.

In order to correct for return loss from the retroreflective screen, it is necessary to calculate the incident angle of the ray path from a pixel location in a projected image at the projector, to the intercept point on the screen. FIG. 10 shows an arrangement of an image projector 1001 pointed at a vertical retroreflective screen 1002 such that the projector 1001 has an image generating panel 1003 located a focal distance (f) 1007 behind an aperture 1004, such that light from a central point 1005 on the panel having image coordinates u=0 and v=0, will form a central ray 1006 that travels a distance (Z) 1008 to contact screen 1002 perpendicularly at its central point, with screen coordinates X=0 and Y=0. Due to the image ray crossover at the aperture 1004 the panel 1003 flips the sign of the coordinates sent to it before accessing its pixel cells; the discussion below will use the coordinates, (u,v) prior to the flip. FIG. 10 also shows a ray 1010 from an image point 1009 where such image point has (pre-flip) image coordinates u=0 and v=a, and having passed through aperture 1004 strikes screen 1002 at point 1011 with screen coordinates X=0 and Y=y1, where ray 1010 intersects at incidence angle 1012.

Using the conventional pinhole model for projector 1001, it can be shown that given a vertical pixel cell size, CellSize, in the pixel array of panel 1003, and an image vertical (v) coordinate of value (a), the angle of exit of ray 1010 with respect to central ray 1006 will be equal to arctan((a) *CellSize/f), and the incident angle 1012 will also have this value. In general, the incident angle will be equal to arctan (v*CellSize/f) for all values of image coordinate v while image coordinate u=0. For simplification, let k=CellSize/f which gives the angle, then, as equal to arctan(v*k).

The case, above, is directly applicable to the u coordinates when v=0, such that the incident angle along the screen X axis will be equal to arctan(u*k) for all values of u where v=0. In order to generalize for all image coordinates, it is only needed to recognize that the u and v displacements form a vector with length sqrt(u^2+v^2)*CellSize, (assuming the cells are square) and the angle with the normal to the panel will therefore be equal to arctan(k*sqrt(u^2+v^2)).

Figure 11:
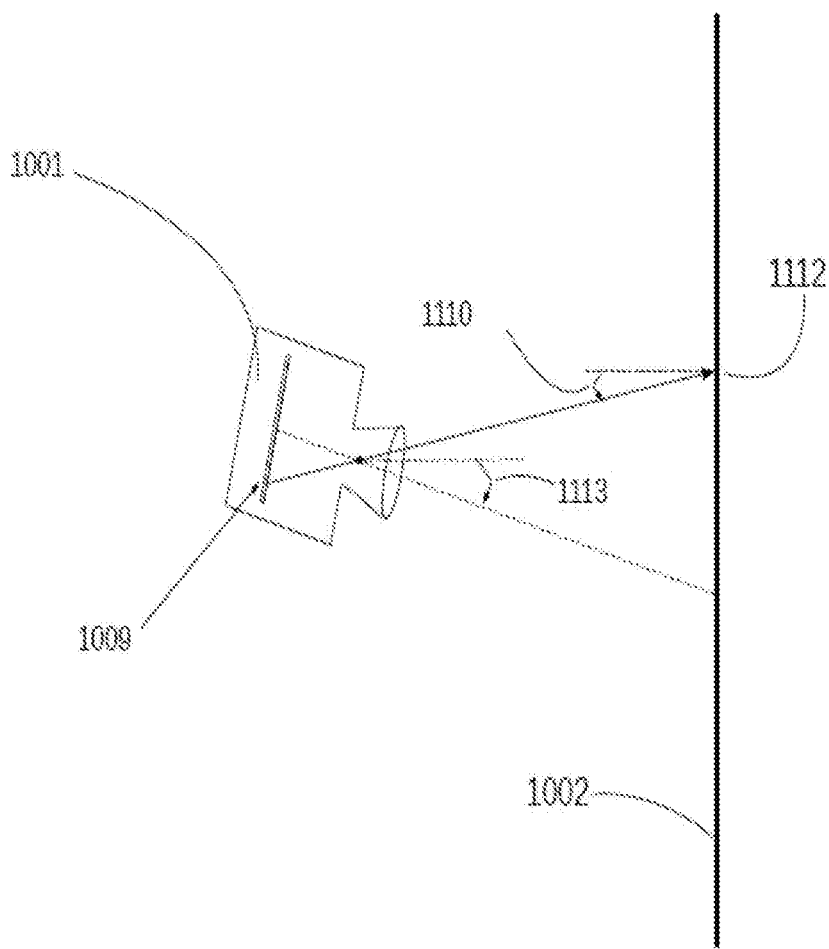
FIG. 11 illustrates an optical geometry for calculating angles for determining a brightness correction factor with the projector pointed down with respect to the retroreflective screen.

The projector in FIG. 10 is shown pointed directly at the retroreflective screen. In terms of angles, this arrangement it is posed with yaw=0, pitch=0, and roll=0 at a distance of Z. FIG. 11 shows an arrangement where the projector has been rotated downward by angle 1113 as a result of setting the projector pitch to −r degrees. In this situation the intercept point that was 1011 in FIG. 10 has moved downward (lower Y value) to point 1112 in FIG. 11. The incidence angle 1110 has also been reduced by the negative pitch value. Simple geometry shows that the new angle 1110 is the combination of the angle produced by the image ray with respect to the projector central ray 1006 and the angular displacement of that central ray with respect to the screen 1002 by the projector rotation. Given (Pitch) to be the value of the new projector pitch angle, the value of angle 1110 will equal Pitch+arctan(v*k).

Figure 12:
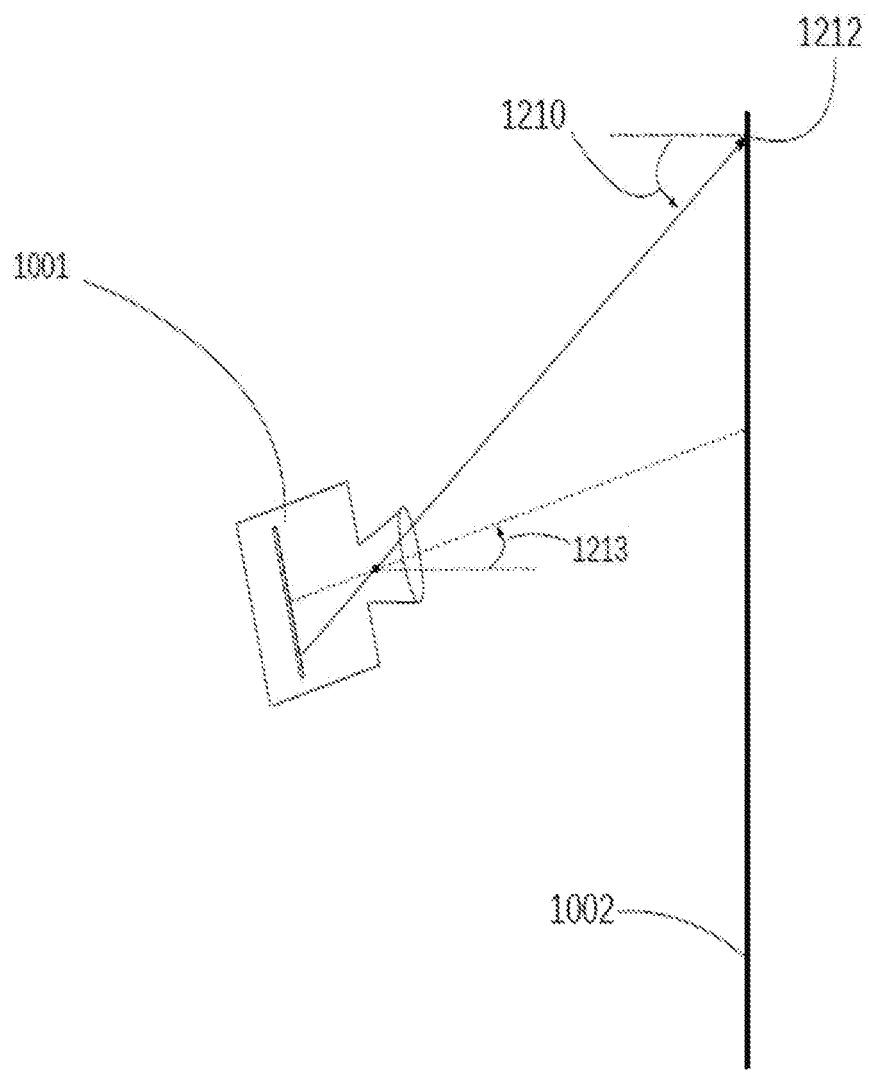
FIG. 12 illustrates an optical geometry for calculating angles for determining a brightness correction factor with the projector pointed up with respect to the retroreflective screen.

FIG. 12 show the matching arrangement of FIG. 11, except that the pitch, r, is now in the positive direction.

As above, the case for the u direction of image coordinate values follows the same pattern. Thus, we can find the incidence angle in the screen X direction when v=0 as equal to Yaw+arctan(u*k). In order to get an approximate combination of the dimensions at the screen and calculate an estimate of the incidence angle it is necessary to convert the angles to distances on the screen and take the arctangent of the square root of the sum of the squares. This approximation loses accuracy away from the center of view, but is adequate for illustration. The distance to the screen, Z, will cancel out in the reduction of terms leaving:

$$\text{Incidence Angle} = \arctan(\sqrt{(\tan(\text{Yaw}+\arctan(u*k)))^2 + (\tan(\text{Pitch}+\arctan(v*k)))^2}) \quad [1]$$

Thus we have an expression for the incident angle for rays from any image coordinates to a projector at any yaw and pitch facing the screen. This almost completes the task, except that the projector may also be rolled to the left or right. In the case where yaw=0 and pitch=0 the roll makes no difference to incidence angle, but not in the general case. The key to the next step is the observation that finding an incident angle for a given pixel ray under roll is the same as finding the incident angle for the pixel that would reside in the same place on the image panel if the projector was at roll=0. To do this, the vector (u,v) in image coordinates can be rotated by the projector roll angle, Roll, to give vector (u',v'), which can then be used in formula [1], above to find the result Roll in this example is measured counterclockwise looking along the projector central ray 1006).

By the well known vector rotation equations we have:

$$u' = u*\cos(\text{Roll}) - v*\sin(\text{Roll}) \quad [2]$$

$$v' = v*\cos(\text{Roll}) + u*\sin(\text{Roll}) \quad [3]$$

Substituting [2] and [3] into [1] yields the general solution:

$$\text{Incidence Angle} = \arctan(\sqrt{(\tan(\text{Yaw}+\arctan((u*\cos(\text{Roll})-v*\sin(\text{Roll}))*k)))^2 + (\tan(\text{Pitch}+\arctan((v*\cos(\text{Roll})+u*\sin(\text{Roll}))*k)))^2}) \quad [4]$$

In one embodiment, the incidence angle is used to index a correcting boost for each primary color. As it is used only for index, it is not necessary to perform the square root and arctangent functions in [4], but rather indexing or a correcting function may be based on just:

$$\text{Index or input to correction function} = (\tan(\text{Yaw}+\arctan((u*\cos(\text{Roll})-v*\sin(\text{Roll}))*k)))^2 + (\tan(\text{Pitch}+\arctan((v*\cos(\text{Roll})+u*\sin(\text{Roll}))*k)))^2 + \quad [5]$$

The trigonometric approximation algorithm above has been presented for purposes of illustration without access to more complex mathematical methods that would likely be used by those skilled in the computer graphics arts. For example, embodiments may be practiced in implementations in which the head pose is available in quaternion form such that for each (u,v), a unit length direction vector may be calculated in the direction that passes through the aperture 1004 whereupon that vector is converted to quaternion to be multiplied by the head pose quaternion (i.e. a rotation operation by two ½ angle multiplies), returned to normalized vector form, and then used to take a scaler product with the normal vector to the surface. (The same may be performed entirely with vectors using vector rotation matrices in place of quaternions.) The scaler product would then be the cosine of the desired incident angle. As above, the arccosine need not be taken, but rather, the cosine may be used directly as an index or input to the color correcting functions.

Figure 13:
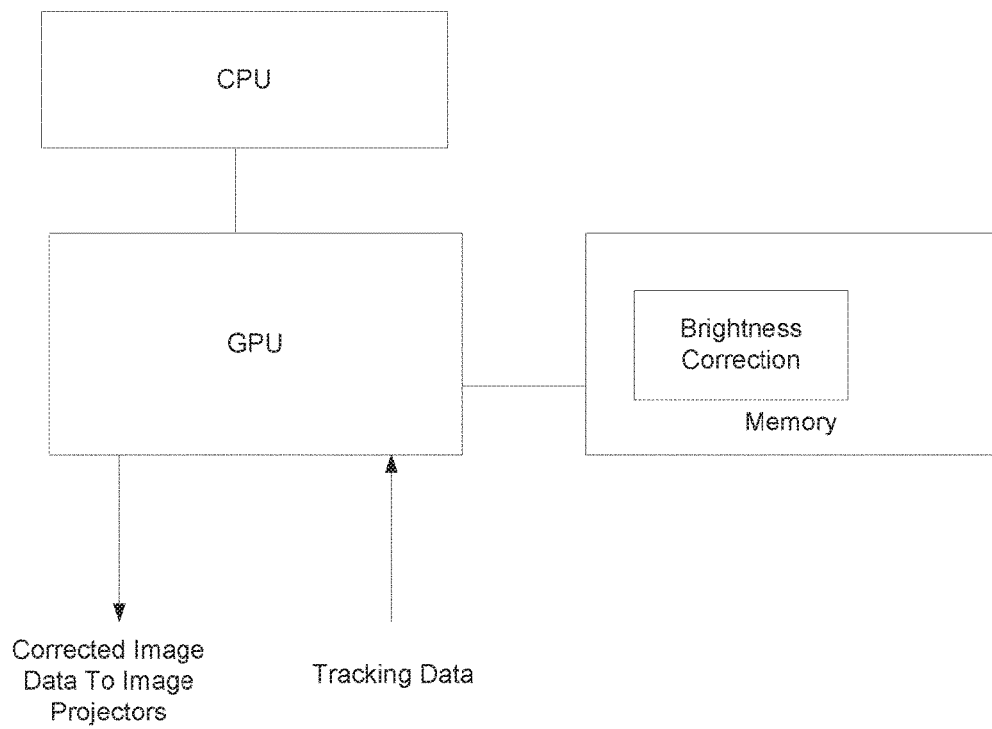
FIG. 13 illustrates correction of pixel brightness in a rendering pipeline.
Figure 14:
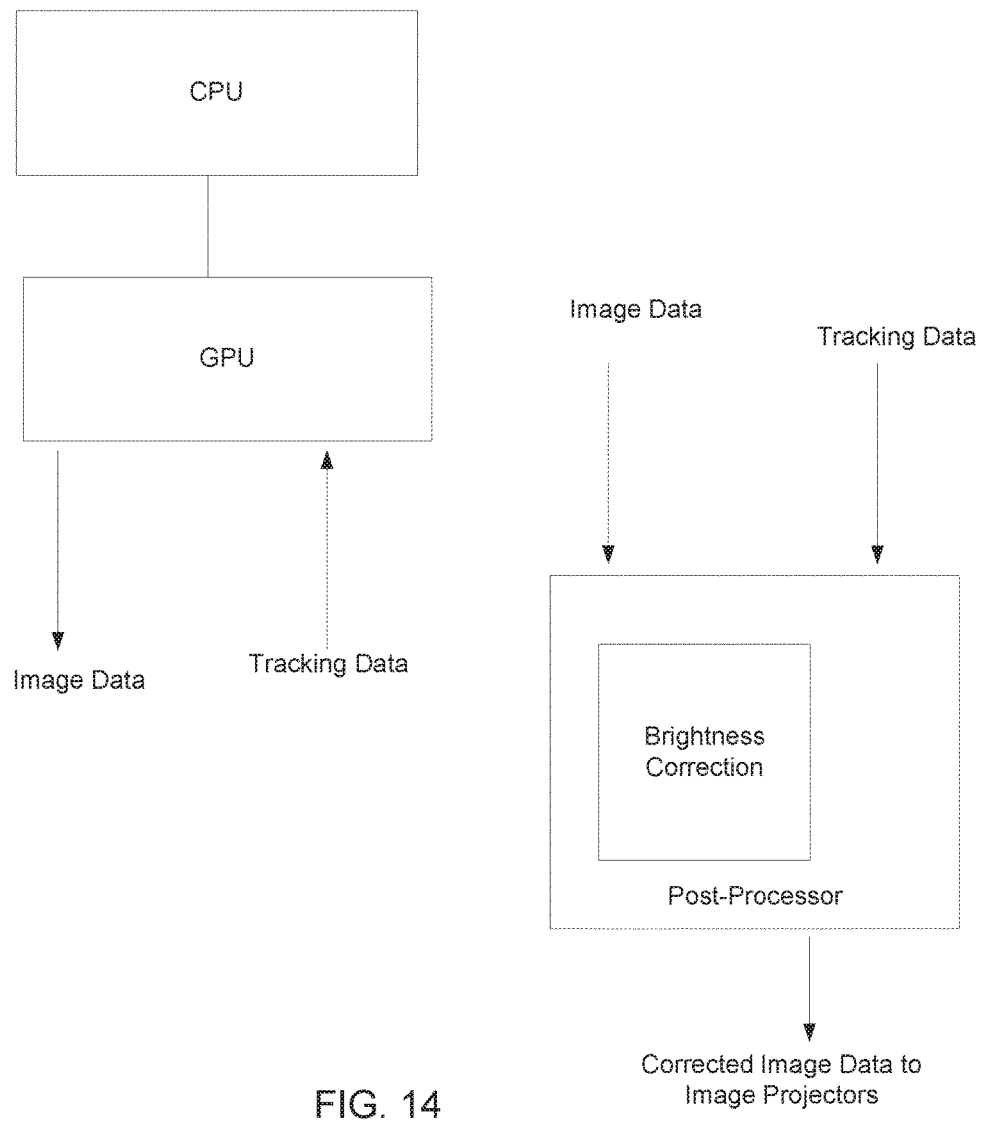
FIG. 14 illustrates correction of pixel brightness in a post-processor.

The brightness correction may be performed in a rendering pipeline, as illustrated in FIG. 13. For example, a brightness correction computer program may be stored as computer program instructions in a non-transitory computer readable memory. For example, the brightness correction may be executed by a programmable graphics processing unit (GPU). The GPU, may for example, receive tracking pose data and output image data which then provided to the projectors of a HMPD. The tracking pose data may be generated using any known technique, such as from external tracking monitors of via tracking sensors mounted internally in a HMPD. FIG. 14 shows an alternate embodiment in which the brightness correction is performed using a post-processor. For example, image data from a GPU may be sent to a post-processor (e.g., a CPU or microcontroller) that in turn performs the brightness correction to pixels before they are projected. For example, in one embodiment the post-processor is incorporated into the HMPD.

Figure 15:
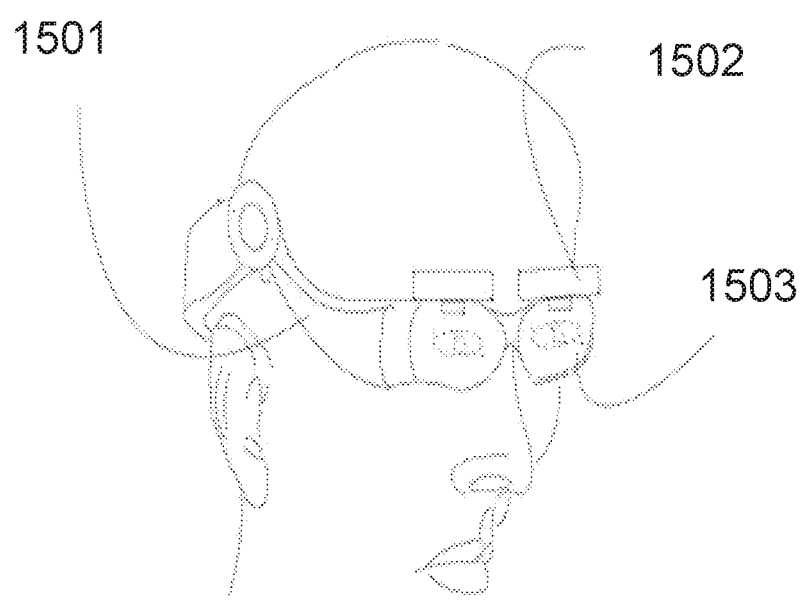
FIG. 15 illustrates a glasses embodiment of an HMPD with low forward protrusion.

In one embodiment, one or more of the previously described features may be used to implement a glasses design or to perform a brightness correction in a glasses design. FIG. 15 illustrates an embodiment of a glass design with a frame 1501, viewing lenses 1503, and image projectors 1502. As illustrated, the image projectors may protrude in a brow region relative to the lenses 1503. The protrusion in the brow region is partially associated with the projectors and other electronics, although in some embodiments the projectors can be positioned away from the brow region as previously described. As previously discussed, the thickness of the polarizing beam splitter and associated optics is an important factor in the forward extension in the brow region. Reducing the forward extension of the polarizing beam splitter and associated optics thus fairly directly reduces the total forward extension in the brow region. It will be understood that any of the embodiments described above may be designed to fit into the viewing lenses 1503. In one embodiment, the protrusion of the viewing lenses is no more than two centimeters, including the beam splitters. In one embodiment, the protrusion of the viewing lenses is no more than one centimeter, including the beam splitters. In one embodiment, the protrusion of the viewing lenses is no more than one-half centimeter, including the beam splitters.

INCORPORATION BY REFERENCE

The following patents, patent publications, and publications are hereby incorporated by reference:
US Patent Publication 2014/0340424;
U.S. Pat. No. 4,312,570;
U.S. Pat. No. 5,383,053;
U.S. Pat. No. 5,572,229;
U.S. Pat. No. 5,606,458;
U.S. Pat. No. 5,621,572;
U.S. Pat. No. 6,535,182;
U.S. Pat. No. 7,522,344;
U.S. Pat. No. 7,525,735;
U.S. Pat. No. 8,259,239;
U.S. Pat. No. 8,511,827;
Southwell, W. H. "Multilayer high reflective coating designs achieving broadband 90 phase change." Los ALamos Conference on Optics' 79. International Society for Optics and Photonics, 1980;
West, Edward A., and Matthew H. Smith. "Polarization errors associated with birefringent waveplates." Optical Engineering 34.6 (1995): 1574-1580;
Hua, Hong, et al. "Engineering of head-mounted projective displays." Applied Optics 39.22 (2000): 3814-3824;
Arrington, K. F., and G. A. Geri. "Conjugate-optical retroreflector display system: Optical principles and perceptual issues." Journal of the Society for Information Display 8.2 (2000): 123-128;
Hua, Hong, Chunyu Gao, and Jannick P. Rolland. "Study of the imaging properties of retro-reflective materials used in head-mounted projective displays (HMPDs)." SPIE Aerosense 2002 (2002): 1-5;
Martins, Ricardo, and Jannick F P. Rolland. "Diffraction of Phase Conjugate Material in a New HMD Architecture." AeroSense 2003. International Society for Optics and Photonics, 2003;
Samoylov, A. V., et al. "Achromatic and super-achromatic zero-order waveplates" Journal of Quantitative Spectroscopy & Radiative Transfer 88 (2004) 319-325;
Hua, Hong, and Chunyu Gao. "A polarized head-mounted projective display." Mixed and Augmented Reality, 2005. Proceedings. Fourth IEEE and ACM International Symposium on. IEEE, 2005;
Rolland, J. P., and Hong Hua. "Head-mounted display systems." Encyclopedia of optical engineering (2005): 1-13;
Cakmakci, Ozan, and Jannick Rolland. "Head-worn displays: a review." Display Technology, Journal of 2.3 (2006): 199-216;
Kiyokawa, Kiyoshi. "A wide field-of-view head mounted projective display using hyperbolic half-silvered mirrors." Proceedings of the 2007 6th IEEE and ACM International Symposium on Mixed and Augmented Reality. IEEE Computer Society, 2007;
Krum, David M., Evan A. Suma, and Mark Bolas. "Augmented reality using personal projection and retroreflection." Personal and Ubiquitous Computing 16.1 (2012): 17-26;
Kress, Bernard, and Thad Starner. "A review of head-mounted displays (HMD) technologies and applications for consumer electronics." SPIE Defense, Security, and Sensing. International Society for Optics and Photonics, 2013; and
Mukund, R. "Quaternions: Form classical mechanics to computer graphics and beyond." Proceedings of the $7^{th}$ Asian Technology conference in Mathematics, 2002.

ALTERNATIVE, MODIFICATIONS, AND EQUIVALENTS

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A head-mounted projection display, comprising:
an image source having a circular polarization;
a polarizing beam splitter to direct output images to a retroreflective screen and transmit returning reflected retroreflective images for viewing by a user;
an optically retarding film formed on the surface of said polarizing beam splitter facing said retroreflective screen, to adjust the polarization of the output images to reduce loss of brightness when reflected from said beam splitter to said retroreflective screen and further to reduce loss of brightness of received retroreflected images as said images pass through said beam splitter to be viewed by said user, wherein said image source projects upon said optically retarding film on said surface of said polarizing beam splitter configuring an optical path passing through said optically retarding film three times in total.

2. The head-mounted projection display of claim 1, wherein the optically retarding film is a quarter wave retarding film.

3. The head-mounted projection display of claim 2, wherein the polarizing beam splitter has fast and slow optical axes oriented to achieve a maximum reflection of the output images and direct the output images to the retroreflective screen and further wherein retroreflected images have a polarization rotated such they are passed through the polarizing beam splitter with a minimum reflection.

4. The head-mounted projection display of claim 1, wherein the image source is plane polarized and the image source utilizes a quarter waveplate to output the circular polarization.

5. The head-mounted projection display of claim 1, wherein the polarizing beam splitter transmits retroreflected light on an optical path generally coaxial to a user's eye.

6. The head-mounted projection display of claim 1, wherein the polarizing beam splitter is oriented at a forty five degree angle with respect to light of incoming images from the image source.

7. The head-mounted projection display of claim 1, wherein the polarizing beam splitter is oriented at an angle of incidence with respect to light of incoming images from the image source that is at least five degrees different from forty-five degrees.

8. The head-mounted projection display of claim 1, wherein there is a lens stack rotation angle (LSRA) and a projector rotation angle (PRA) selected to adjust a line of view with respect to an external retroreflective screen.

9. The head-mounted projection display of claim 8, wherein the line of view is adjusted for the user to view a horizontal retroreflective game board.

10. The head-mounted projection display of claim 9, wherein the line of view is reduced by at least 10 degrees.

11. The head-mounted projection display of claim 8, wherein LSRA and the PRA are selected to reduce a forward extension of the polarizing beam splitter.

12. The head-mounted projection display of claim 9, wherein the head mounted projection display includes a glasses frame with the image source and the polarizing beam splitter disposed in the glasses frame and a forward extension of a brow portion of the head mounted display is less than one centimeter.

13. The head-mounted projection display of claim 12, wherein the forward extension is less than one-half centimeter.

14. The head-mounted projection display of claim 1, wherein the polarizing beam splitter is curved with a convex curvature to form a convex polarizing beam splitter to increase a field of view compared with a planar polarizing beam splitter.

15. The head-mounted projection display of claim 14, wherein the convex curvature is chosen to reduce a lateral width of the polarizing beam splitter.

16. The head-mounted projection display system of claim 14, further comprising:
a movable semitransparent visor having a concave semitransparent surface shaped to move into a position to reverse an optical path of image reflected from the convex polarizing beam splitter back through the convex polarizing beam splitter.

17. The head-mounted projection display of claim 1, further including at least one processor to generate images for the image source, including generating a brightness value for at least each primary color component of a pixel wherein the brightness of each primary color component is adjusted to at least partially compensate for an angular chromatic response of an external retroreflector.

18. The head-mounted projection display of claim 1, further including at least one processor to generate images for the image source, including generating a brightness value for at least each primary color component of a pixel wherein the brightness of each primary color component is adjusted to at least partially compensate for an angular chromatic response of the polarizing beam splitter and the optically retarding film.

19. The head-mounted projection display of claim 17, wherein the at least one processor receives information from a pose tracking system indicative of an angle from the HMPD to the retroreflective screen; and
adjusts the primary color intensities of pixels of an image given the information obtained from the pose tracking system.

20. The head-mounted projection display of claim 17, wherein:
the at least one processor for each pixel of an image to be projected, fetches each primary color brightness; determines a brightness correction factor based at least in part on a pixel ray incidence angle with respect to the retroreflective surface;
and the said at least one processor corrects the brightness of each primary color for each pixel based on the brightness correction factor.

21. The head-mounted projection display of claim 1, further including:
at least one processor to generate images for the image source, including adjusting the intensities of the primary colors of the projected pixels based at least in part on a calculation of the incidence angle of each pixel to at least partially compensate for image distortion due to imperfect headset optics or imperfect retroreflection.

22. The head-mounted projection display of claim 1, further including:
at least one processor to generate images for the image source, wherein a rendering pipeline shades the pixels using the head pose angle with regard to a retroreflective surface to calculate the return ratio for a given primary color wavelength, and then boosts the brightness of the primary color wavelength to compensate for the expected return loss so as to keep a balanced perceived shading as the user changes viewing position.

23. A head-mounted projection display with low forward extension, comprising:
a glasses frame;
an image source mounted to the glasses frame and having a circular polarization;
a polarizing beam splitter mounted to the glasses frame to direct output images to a retroreflective screen and transmit returning reflected retroreflective images for viewing by a user;
an optically retarding film formed on at least one surface of the polarizing beam splitter to adjust the polarization of the output images to reduce loss of brightness of outgoing images reflected to the retroreflective screen and further to reduce loss of brightness of received retroreflected images; and
wherein a forward extension of the glasses frame in a brow region is less than one centimeter.

24. The head-mounted projection display of claim 23, further comprising:
at least one processor to generate images for the image source based at least in part on head pose tracking information, including adjusting the intensities of the primary colors of the projected pixels based at least in part on a calculation of the incidence angle of each pixel to at least partially compensate for image distortion due to imperfect headset optics or angular and chromatic imperfections of the retroreflection by the retroreflective screen.

25. A method of operating a head mounted projection display, comprising:
- utilizing a polarizing beam splitter with an integrated optical retarding film to direct projected light to a retroreflective screen and transmit returned images; and
- performing a brightness correction of the intensities of pixels of images that are projected to the retroreflective screen by adjusting the intensities of the primary colors of the projected pixels based at least in part on a calculation of the incidence angle of each pixel to at least partially compensate for image distortion due to imperfect headset optics or imperfect retroreflection.

* * * * *